United States Patent
Burns et al.

(10) Patent No.: US 12,455,641 B2
(45) Date of Patent: Oct. 28, 2025

(54) METHOD AND DEVICE FOR DYNAMICALLY SELECTING AN OPERATION MODALITY FOR AN OBJECT

(71) Applicant: Apple Inc., Cupertino, CA (US)

(72) Inventors: Aaron M. Burns, Sunnyvale, CA (US); Anette L. Freiin von Kapri, Mountain View, CA (US); Arun Rakesh Yoganandan, San Francisco, CA (US); Benjamin R. Blachnitzky, San Francisco, CA (US); Christopher L. Nolet, San Francisco, CA (US); David M. Schattel, Santa Clara, CA (US); Samantha Koire, Sacramento, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/576,654

(22) PCT Filed: Jul. 1, 2022

(86) PCT No.: PCT/US2022/036027
§ 371 (c)(1),
(2) Date: Jan. 4, 2024

(87) PCT Pub. No.: WO2023/283145
PCT Pub. Date: Jan. 12, 2023

(65) Prior Publication Data
US 2025/0004581 A1    Jan. 2, 2025

Related U.S. Application Data

(60) Provisional application No. 63/218,471, filed on Jul. 5, 2021.

(51) Int. Cl.
*G06F 3/00*  (2006.01)
*G06F 3/01*  (2006.01)
(Continued)

(52) U.S. Cl.
CPC .............. *G06F 3/038* (2013.01); *G06F 3/012* (2013.01); *G06F 3/0346* (2013.01); *G06V 20/20* (2022.01)

(58) Field of Classification Search
CPC ........ G06F 3/038; G06F 3/012; G06F 3/0346; G06V 20/20
See application file for complete search history.

(56) References Cited

U.S. PATENT DOCUMENTS 9,513,720 B2    12/2016  Ogata et al.
9,823,747 B2    11/2017  Underkoffler et al.
(Continued)

FOREIGN PATENT DOCUMENTS

| JP | 2017518572 A | 7/2017 |
| KR | 20170016472 A | 2/2017 |
| WO | 2019232131 A1 | 12/2019 |

OTHER PUBLICATIONS

PCT International Search Report and Written Opinion dated Nov. 18, 2022, PCT International Application No. PCT/US2022/036027, pp. 1-12.
(Continued)

*Primary Examiner* — Roy P Rabindranath
(74) *Attorney, Agent, or Firm* — Fernando & Partners, LLP

(57) ABSTRACT

In one implementation. a method for dynamically selecting an operation modality for a physical object. The method includes: obtaining a user input vector that includes at least one user input indicator value associated with one of a plurality of different input modalities; obtaining tracking data associated with a physical object; generating a first characterization vector for the physical object, including a pose value and a user grip value, based on the user input vector and the tracking data, wherein the pose value characterizes a spatial relationship between the physical object
(Continued)

and a user of the computing system and the user grip value characterizes a manner in which the physical object is being held by the user; and selecting, based on the first characterization vector, a first operation modality as a current operation modality for the physical object.

20 Claims, 26 Drawing Sheets

(51) Int. Cl.
  *G06F 3/0346* (2013.01)
  *G06F 3/038* (2013.01)
  *G06V 20/20* (2022.01)

(56) References Cited

U.S. PATENT DOCUMENTS

| | | | |
|---|---|---|---|
| 2011/0025603 A1* | 2/2011 | Underkoffler | G06V 40/107 345/158 |
| 2012/0054620 A1* | 3/2012 | Tilley | G06F 3/04883 715/810 |
| 2015/0363034 A1 | 12/2015 | Hinckley et al. | |
| 2019/0362557 A1 | 11/2019 | Lacey et al. | |
| 2020/0272257 A1 | 8/2020 | Kumar et al. | |

OTHER PUBLICATIONS

Japanese Office Action dated Dec. 16, 2024, Japanese Application No. 2024500164, pp. 1-7.
Preliminary Rejection for corresponding Korean Application No. 10-2024-7000523 dated Jun. 25, 2025.

* cited by examiner

METHOD AND DEVICE FOR DYNAMICALLY SELECTING AN OPERATION MODALITY FOR AN OBJECT

TECHNICAL FIELD

The present disclosure generally relates to interacting with an environment with an object and, in particular, to systems, methods, and methods for dynamically selecting an operation modality for a physical object.

BACKGROUND

In order to change the behavior of a stylus, a user typically selects a different tool from a menu of available tools. This can be a clumsy and cumbersome process.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
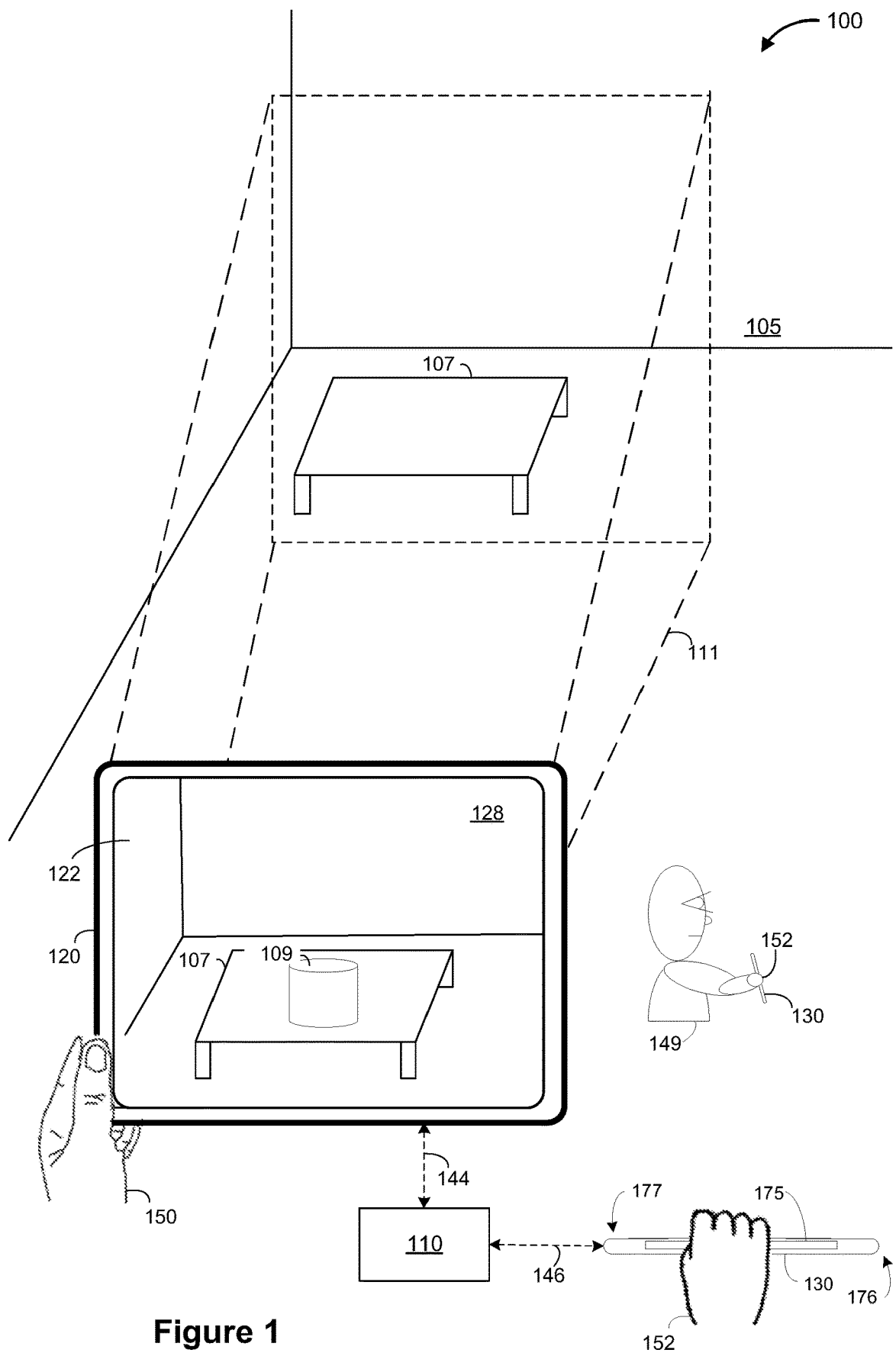
FIG. 1 is a block diagram of an example operating architecture in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

SUMMARY

Various implementations disclosed herein include devices, systems, and methods for dynamically selecting an operation modality for a physical object. According to some implementations, the method is performed at a computing system including non-transitory memory and one or more processors, wherein the computing system is communicatively coupled to a display device. The method includes: obtaining a user input vector that includes at least one user input indicator value associated with one of a plurality of different input modalities: obtaining tracking data associated with a physical object: generating a first characterization vector for the physical object, including a pose value and a user grip value, based on the user input vector and the tracking data, wherein the pose value characterizes a spatial relationship between the physical object and a user of the computing system and the user grip value characterizes a manner in which the physical object is being held by the user: and selecting, based on the first characterization vector, a first operation modality as a current operation modality for the physical object.

In accordance with some implementations, an electronic device includes one or more displays, one or more processors, a non-transitory memory, and one or more programs: the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more displays, one or more processors, a non-transitory memory, and means for performing or causing performance of any of the methods described herein.

In accordance with some implementations, a computing system includes one or more processors, non-transitory memory, an interface for communicating with a display device and one or more input devices, and one or more programs: the one or more programs are stored in the non-transitory memory and configured to be executed by the one or more processors and the one or more programs include instructions for performing or causing performance of the operations of any of the methods described herein. In accordance with some implementations. a non-transitory computer readable storage medium has stored therein instructions which when executed by one or more processors of a computing system with an interface for communicating with a display device and one or more input devices, cause the computing system to perform or cause performance of the operations of any of the methods described herein. In accordance with some implementations, a computing system includes one or more processors, non-transitory memory, an interface for communicating with a display device and one or more input devices, and means for performing or causing performance of the operations of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

People may sense or interact with a physical environment or world without using an electronic device. Physical features, such as a physical object or surface, may be included within a physical environment. For instance, a physical environment may correspond to a physical city having physical buildings, roads, and vehicles. People may directly sense or interact with a physical environment through various means, such as smell, sight, taste, hearing, and touch. This can be in contrast to an extended reality (XR) environment that may refer to a partially or wholly simulated environment that people may sense or interact with using an electronic device. The XR environment may include virtual reality (VR) content, mixed reality (MR) content, augmented reality (AR) content, or the like. Using an XR system, a portion of a person's physical motions, or representations thereof, may be tracked and, in response, properties of virtual objects in the XR environment may be changed in a way that complies with at least one law of nature. For example, the XR system may detect a user's head movement and adjust auditory and graphical content presented to the user in a way that simulates how sounds and views would change in a physical environment. In other examples, the XR system may detect movement of an electronic device (e.g., a laptop, tablet, mobile phone, or the like) presenting the XR environment. Accordingly, the XR system may adjust auditory and graphical content presented to the user in a way that simulates how sounds and views would change in a physical environment. In some instances, other inputs, such as a representation of physical motion (e.g., a voice command), may cause the XR system to adjust properties of graphical content.

Numerous types of electronic systems may allow a user to sense or interact with an XR environment. A non-exhaustive list of examples includes lenses having integrated display capability to be placed on a user's eyes (e.g., contact lenses), heads-up displays (HUDs), projection-based systems, head mountable systems, windows or windshields having integrated display technology, headphones/earphones, input systems with or without haptic feedback (e.g., handheld or wearable controllers), smartphones, tablets, desktop/laptop computers, and speaker arrays. Head mountable systems may include an opaque display and one or more speakers. Other head mountable systems may be configured to receive an opaque external display, such as that of a smartphone. Head mountable systems may capture images/video of the physical environment using one or more image sensors or capture audio of the physical environment using one or more microphones. Instead of an opaque display, some head mountable systems may include a transparent or translucent display. Transparent or translucent displays may direct light representative of images to a user's eyes through a medium, such as a hologram medium, optical waveguide, an optical combiner, optical reflector, other similar technologies, or combinations thereof. Various display technologies, such as liquid crystal on silicon, LEDs, μLEDs, OLEDs, laser scanning light source, digital light projection, or combinations thereof, may be used. In some examples, the transparent or translucent display may be selectively controlled to become opaque. Projection-based systems may utilize retinal projection technology that projects images onto a user's retina or may project virtual content into the physical environment, such as onto a physical surface or as a hologram.

FIG. 1 is a block diagram of an example operating architecture 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating architecture 100 includes an optional processing device 110 and an electronic device 120 (e.g., a tablet, mobile phone, laptop, near-eye system, wearable computing device, or the like).

In some implementations, the processing device 110 is configured to manage and coordinate an XR experience (sometimes also referred to herein as a "XR environment" or a "virtual environment" or a "graphical environment") for a user 149 with a left hand 150 and a right hand 152 and optionally other users. In some implementations, the processing device 110 includes a suitable combination of software, firmware, and/or hardware. The processing device 110 is described in greater detail below with respect to FIG. 2. In some implementations, the processing device 110 is a computing device that is local or remote relative to the physical environment 105. For example, the processing device 110 is a local server located within the physical environment 105. In another example, the processing device 110 is a remote server located outside of the physical environment 105 (e.g., a cloud server, central server, etc.). In some implementations, the processing device 110 is communicatively coupled with the electronic device 120 via one or more wired or wireless communication channels 144 (e.g., BLUETOOTH, IEEE 802.11x, IEEE 802.16x, IEEE 802.3x, etc.). In some implementations, the functions of the processing device 110 are provided by the electronic device 120. As such, in some implementations, the components of the processing device 110 are integrated into the electronic device 120.

As shown in FIG. 1, the user 149 grasps a controller 130 in his/her right hand 152. As shown in FIG. 1, the controller 130 includes a first end 176 and a second end 177. In various embodiments, the first end 176 corresponds to a tip of the controller 130 (e.g., the tip of a pencil) and the second end 177 corresponds to the opposite or bottom end of the controller 130 (e.g., the eraser of the pencil). As shown in FIG. 1, the controller 130 includes a touch-sensitive surface 175 to receive touch inputs from the user 149. In some implementations, the controller 130) includes a suitable combination of software, firmware, and/or hardware. The controller 130 is described in greater detail below with respect to FIG. 4. In some implementations, the controller 130 corresponds to an electronic device with a wired or wireless communication channel to the processing device 110. For example, the controller 130 corresponds to a stylus, a finger-wearable device, a handheld device, or the like. In some implementations, the processing device 110 is communicatively coupled with the controller 130 via one or more wired or wireless communication channels 146 (e.g., BLUETOOTH, IEEE 802.11x, IEEE 802.16x, IEEE 802.3x, etc.).

In some implementations, the electronic device 120 is configured to present audio and/or video (A/V) content to the user 149. In some implementations, the electronic device 120 is configured to present a user interface (UI) and/or an XR environment 128 to the user 149. In some implementations, the electronic device 120 includes a suitable combination of software, firmware, and/or hardware. The electronic device 120 is described in greater detail below with respect to FIG. 3.

According to some implementations, the electronic device 120 presents an XR experience to the user 149 while the user 149 is physically present within a physical environment 105 that includes a table 107 within the field-of-view (FOV) 111 of the electronic device 120. As such, in some implementations, the user 149 holds the electronic device 120 in his/her hand(s). In some implementations, while presenting the XR experience, the electronic device 120 is configured to present XR content (sometimes also referred to herein as "graphical content" or "virtual content"), including an XR cylinder 109, and to enable video pass-through of the physical environment 105 (e.g., including the table 107 or a representation thereof) on a display 122. For example, the XR environment 128, including the XR cylinder 109, is volumetric or three-dimensional (3D).

In one example, the XR cylinder 109 corresponds to display-locked content such that the XR cylinder 109 remains displayed at the same location on the display 122 as the FOV 111 changes due to translational and/or rotational movement of the electronic device 120. As another example, the XR cylinder 109 corresponds to world-locked content such that the XR cylinder 109 remains displayed at its origin location as the FOV 111 changes due to translational and/or rotational movement of the electronic device 120. As such, in this example, if the FOV 111 does not include the origin location, the XR environment 128 will not include the XR cylinder 109. For example, the electronic device 120 corresponds to a near-eye system, mobile phone, tablet, laptop, wearable computing device, or the like.

In some implementations, the display 122 corresponds to an additive display that enables optical see-through of the physical environment 105 including the table 107. For example, the display 122 corresponds to a transparent lens, and the electronic device 120 corresponds to a pair of glasses worn by the user 149. As such, in some implementations, the electronic device 120 presents a user interface by projecting the XR content (e.g., the XR cylinder 109) onto the additive display, which is, in turn, overlaid on the physical environment 105 from the perspective of the user 149. In some implementations, the electronic device 120 presents the user interface by displaying the XR content (e.g., the XR cylinder 109) on the additive display, which is, in turn, overlaid on the physical environment 105 from the perspective of the user 149.

In some implementations, the user 149 wears the electronic device 120 such as a near-eye system. As such, the electronic device 120 includes one or more displays provided to display the XR content (e.g., a single display or one for each eye). For example, the electronic device 120 encloses the FOV of the user 149. In such implementations, the electronic device 120 presents the XR environment 128 by displaying data corresponding to the XR environment 128 on the one or more displays or by projecting data corresponding to the XR environment 128 onto the retinas of the user 149.

In some implementations, the electronic device 120 includes an integrated display (e.g., a built-in display) that displays the XR environment 128. In some implementations, the electronic device 120 includes a head-mountable enclosure. In various implementations, the head-mountable enclosure includes an attachment region to which another device with a display can be attached. For example, in some implementations, the electronic device 120 can be attached to the head-mountable enclosure. In various implementations, the head-mountable enclosure is shaped to form a receptacle for receiving another device that includes a display (e.g., the electronic device 120). For example, in some implementations, the electronic device 120 slides/snaps into or otherwise attaches to the head-mountable enclosure. In some implementations, the display of the device attached to the head-mountable enclosure presents (e.g., displays) the XR environment 128. In some implementations, the electronic device 120 is replaced with an XR chamber, enclosure, or room configured to present XR content in which the user 149 does not wear the electronic device 120.

In some implementations, the processing device 110 and/or the electronic device 120 cause an XR representation of the user 149 to move within the XR environment 128 based on movement information (e.g., body pose data, eye tracking data, hand/limb/finger/extremity tracking data, etc.) from the electronic device 120 and/or optional remote input devices within the physical environment 105. In some implementations, the optional remote input devices correspond to fixed or movable sensory equipment within the physical environment 105 (e.g., image sensors, depth sensors, infrared (IR) sensors, event cameras, microphones, etc.). In some implementations, each of the remote input devices is configured to collect/capture input data and provide the input data to the processing device 110 and/or the electronic device 120 while the user 149 is physically within the physical environment 105. In some implementations, the remote input devices include microphones, and the input data includes audio data associated with the user 149 (e.g., speech samples). In some implementations, the remote input devices include image sensors (e.g., cameras), and the input data includes images of the user 149. In some implementations, the input data characterizes body poses of the user 149 at different times. In some implementations, the input data characterizes head poses of the user 149 at different times. In some implementations, the input data characterizes hand tracking information associated with the hands of the user 149 at different times. In some implementations, the input data characterizes the velocity and/or acceleration of body parts of the user 149 such as his/her hands. In some implementations, the input data indicates joint positions and/or joint orientations of the user 149. In some implementations, the remote input devices include feedback devices such as speakers, lights, or the like.

Figure 2:
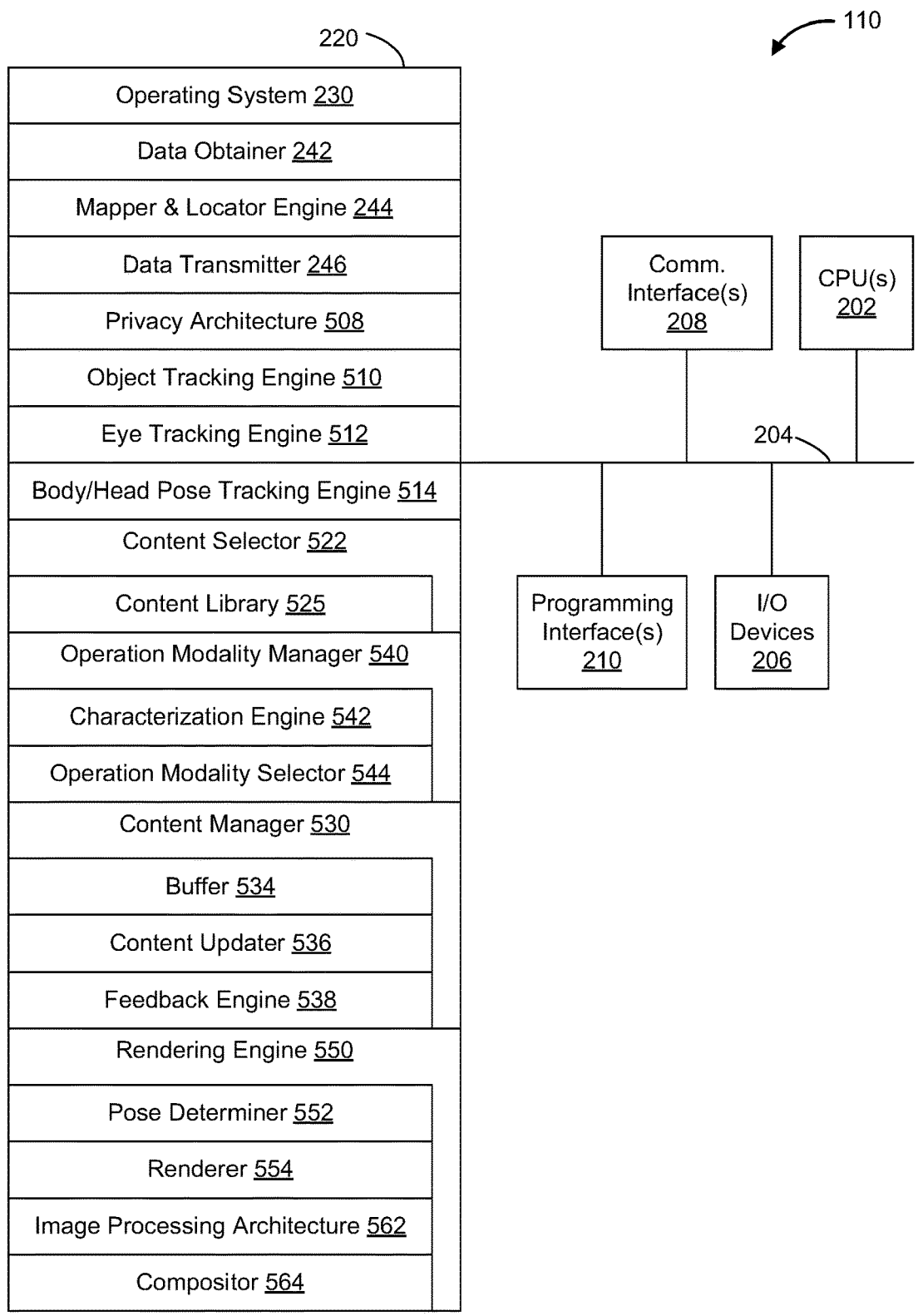
FIG. 2 is a block diagram of an example controller in accordance with some implementations.

FIG. 2 is a block diagram of an example of the processing device 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the processing device 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a key board, a mouse, a touchpad, a touchscreen, a joystick, one or more microphones, one or more speakers, one or more image sensors, one or more displays, and/or the like.

The memory 220 includes high-speed random-access memory, such as dynamic random-access memory (DRAM), static random-access memory (SRAM), doubledata-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof described below with respect to FIG. 2.

The operating system 230 includes procedures for handling various basic system services and for performing hardware dependent tasks.

In some implementations, a data obtainer 242 is configured to obtain data (e.g., captured image frames of the physical environment 105, presentation data, input data, user interaction data, camera pose tracking information, eye tracking information, head/body pose tracking information, hand/limb/finger/extremity tracking information, sensor data, location data, etc.) from at least one of the I/O devices 206 of the processing device 110, the I/O devices and sensors 306 of the electronic device 120, and the optional remote input devices. To that end, in various implementations, the data obtainer 242 includes instructions and/or logic therefor, and heuristics and metadata therefor.

In some implementations, a mapper and locator engine 244 is configured to map the physical environment 105 and to track the position/location of at least the electronic device 120 or the user 149 with respect to the physical environment 105. To that end, in various implementations, the mapper and locator engine 244 includes instructions and/or logic therefor, and heuristics and metadata therefor.

In some implementations, a data transmitter 246 is configured to transmit data (e.g., presentation data such as rendered image frames associated with the XR environment, location data, etc.) to at least the electronic device 120 and optionally one or more other devices. To that end, in various implementations, the data transmitter 246 includes instructions and/or logic therefor, and heuristics and metadata therefor.

In some implementations, a privacy architecture 508 is configured to ingest data and filter user information and/or identifying information within the data based on one or more privacy filters. The privacy architecture 508 is described in more detail below with reference to FIG. 5A. To that end, in various implementations, the privacy architecture 508 includes instructions and/or logic therefor, and heuristics and metadata therefor.

In some implementations, an object tracking engine 510 is configured to determine/generate an object tracking vector 511 for tracking a physical object (e.g., the controller 130 or a proxy object) based on tracking data and update the pose characterization vector 515 object tracking vector 511 over time. For example, as shown in FIG. 5B, the object tracking vector 511 includes translational values 572 for the physical object (e.g., associated with x, y, and z coordinates relative to the physical environment 105 or the world-at-large), rotational values 574 for the physical object (e.g., roll, pitch, and yaw), one or more pressure values 576 associated with the physical object, optional touch input information 578 associated with the physical object, and/or the like. The object tracking engine 510 is described in more detail below with reference to FIG. 5A. To that end, in various implementations, the object tracking engine 510 includes instructions and/or logic therefor, and heuristics and metadata therefor.

In some implementations, an eye tracking engine 512 is configured to determine/generate an eye tracking vector 513 as shown in FIG. 5B (e.g., with a gaze direction) based on the input data and update the eye tracking vector 513 over time. For example, the gaze direction indicates a point (e.g., associated with x, y, and z coordinates relative to the physical environment 105 or the world-at-large), a physical object, or a region of interest (ROI) in the physical environment 105 at which the user 149 is currently looking. As another example, the gaze direction indicates a point (e.g., associated with x, y, and z coordinates relative to the XR environment 128), an XR object, or a region of interest (ROI) in the XR environment 128 at which the user 149 is currently looking. The eye tracking engine 512 is described in more detail below with reference to FIG. 5A. To that end, in various implementations, the eye tracking engine 512 includes instructions and/or logic therefor, and heuristics and metadata therefor.

In some implementations, a body/head pose tracking engine 514 is configured to determine/generate a pose characterization vector 515 based on the input data and update the pose characterization vector 515 over time. For example, as shown in FIG. 5B, the pose characterization vector 515 includes a head pose descriptor 592A (e.g., upward, downward, neutral, etc.), translational values 592B for the head pose, rotational values 592C for the head pose, a body pose descriptor 594A (e.g., standing, sitting, prone, etc.), translational values 594B for body sections/extremities/limbs/joints, rotational values 594C for the body sections/extremities/limbs/joints, and/or the like. The body/head pose tracking engine 514 is described in more detail below with reference to FIG. 5A. To that end, in various implementations, the body/head pose tracking engine 514 includes instructions and/or logic therefor, and heuristics and metadata therefor. In some implementations, the object tracking engine 510, the eye tracking engine 512, and the body/head pose tracking engine 514 may be located on the electronic device 120 in addition to or in place of the processing device 110.

In some implementations, a content selector 522 is configured to select XR content (sometimes also referred to herein as "graphical content" or "virtual content") from a content library 525 based on one or more user requests and/or inputs (e.g., a voice command, a selection from a user interface (UI) menu of XR content items, and/or the like). The content selector 522 is described in more detail below with reference to FIG. 5A. To that end, in various implementations, the content selector 522 includes instructions and/or logic therefor, and heuristics and metadata therefor.

In some implementations, the content library 525 includes a plurality of content items such as audio/visual (A/V) content, virtual agents (VAs), and/or XR content, objects, items, scenery, etc. As one example, the XR content includes 3D reconstructions of user captured videos, movies, TV episodes, and/or other XR content. In some implementations, the content library 525 is pre-populated or manually authored by the user 149. In some implementations, the content library 525 is located local relative to the processing device 110. In some implementations, the content library 525 is located remote from the processing device 110 (e.g., at a remote server, a cloud server, or the like).

In some implementations, an operation modality manager 540 is configured to select an operation modality for a physical object (e.g., the controller 130 or a proxy object)

based on a characterization vector 543 shown in FIG. 5B for the physical object, including a pose value and a user grip value, wherein the characterization vector 543 is a function of a user input vector (e.g., a combination of the eye tracking vector 513 and the pose characterization vector 515) and the tracking data (e.g., the object racking vector 511). The operation modality manager 540 is described in more detail below with reference to FIG. 5A. To that end, in various implementations, the operation modality manager 540 includes instructions and/or logic therefor, and heuristics and metadata therefor. In some implementations, the operation modality manager 540 includes a characterization engine 542 and an operation modality selector 544.

In some implementations, the characterization engine 542 is configured to determine/generate the characterization vector 543 for the physical object based on a user input vector (e.g., a combination of the eye tracking vector 513 and the pose characterization vector 515) and the tracking data (e.g., the object tracking vector 511). In some implementations, the characterization engine 542 is also configured to update the pose characterization vector 515 over time. As shown in FIG. 5B, the characterization vector 543 includes a user grip value 5102 and a pose value 5104. The characterization engine 542 is described in more detail below with reference to FIG. 5A. To that end, in various implementations, the characterization engine 542 includes instructions and/or logic therefor, and heuristics and metadata therefor.

In some implementations, the operation modality selector 544 is configured to select a current operation modality for the physical object (when interacting with the XR environment 128) based on the characterization vector 543. For example, the operation modalities may include a dictation mode, a digital assistant mode, a navigation mode, a manipulation mode, a marking mode, an erasing mode, a pointing mode, an embodying mode, and/or the like. The operation modality selector 544 is described in more detail below with reference to FIG. 5A. To that end, in various implementations, the operation modality selector 544 includes instructions and/or logic therefor, and heuristics and metadata therefor.

In some implementations, a content manager 530 is configured to manage and update the layout, setup, structure, and/or the like for the XR environment 128 including one or more of VA(s), XR content, one or more user interface (UI) elements associated with the XR content, and/or the like. The content manager 530 is described in more detail below with reference to FIG. 5C. To that end, in various implementations, the content manager 530) includes instructions and/or logic therefor, and heuristics and metadata therefor. In some implementations, the content manager 530 includes a buffer 534, a content updater 536, and a feedback engine 538. In some implementations, the buffer 534 includes XR content, a rendered image frame, and/or the like for one or more past instances and/or frames.

In some implementations, the content updater 536 is configured to modify the XR environment 128 over time based on translational or rotational movement of the electronic device 120 or physical objects within the physical environment 105, user inputs (e.g., hand/extremity tracking inputs, eye tracking inputs, touch inputs, voice commands, manipulation inputs with the physical object, and/or the like), and/or the like. To that end, in various implementations, the content updater 536 includes instructions and/or logic therefor, and heuristics and metadata therefor.

In some implementations, the feedback engine 538 is configured to generate sensory feedback (e.g., visual feedback such as text or lighting changes, audio feedback, haptic feedback, etc.) associated with the XR environment 128. To that end, in various implementations, the feedback engine 538 includes instructions and/or logic therefor, and heuristics and metadata therefor.

In some implementations, a rendering engine 550 is configured to render an XR environment 128 (sometimes also referred to herein as a "graphical environment" or "virtual environment") or image frame associated therewith as well as the VA(s), XR content, one or more UI elements associated with the XR content, and/or the like. To that end, in various implementations, the rendering engine 550 includes instructions and/or logic therefor, and heuristics and metadata therefor. In some implementations, the rendering engine 550 includes a pose determiner 552, a renderer 554, an optional image processing architecture 562, and an optional compositor 564. One of ordinary skill in the art will appreciate that the optional image processing architecture 562 and the optional compositor 564 may be present for video pass-through configurations but may be removed for fully VR or optical see-through configurations.

In some implementations, the pose determiner 552 is configured to determine a current camera pose of the electronic device 120 and/or the user 149 relative to the A/V content and/or XR content. The pose determiner 552 is described in more detail below with reference to FIG. 5A. To that end, in various implementations, the pose determiner 552 includes instructions and/or logic therefor, and heuristics and metadata therefor.

In some implementations, the renderer 554 is configured to render the A/V content and/or the XR content according to the current camera pose relative thereto. The renderer 554 is described in more detail below with reference to FIG. 5A. To that end, in various implementations, the renderer 554 includes instructions and/or logic therefor, and heuristics and metadata therefor.

In some implementations, the image processing architecture 562 is configured to obtain (e.g., receive, retrieve, or capture) an image stream including one or more images of the physical environment 105 from the current camera pose of the electronic device 120 and/or the user 149. In some implementations, the image processing architecture 562 is also configured to perform one or more image processing operations on the image stream such as warping, color correction, gamma correction, sharpening, noise reduction, white balance, and/or the like. The image processing architecture 562 is described in more detail below with reference to FIG. 5A. To that end, in various implementations, the image processing architecture 562 includes instructions and/or logic therefor, and heuristics and metadata therefor.

In some implementations, the compositor 564 is configured to composite the rendered A/V content and/or XR content with the processed image stream of the physical environment 105 from the image processing architecture 562 to produce rendered image frames of the XR environment 128 for display. The compositor 564 is described in more detail below with reference to FIG. 5A. To that end, in various implementations, the compositor 564 includes instructions and/or logic therefor, and heuristics and metadata therefor.

Although the data obtainer 242, the mapper and locator engine 244, the data transmitter 246, the privacy architecture 508, the object tracking engine 510, the eye tracking engine 512, the body/head pose tracking engine 514, the content selector 522, the content manager 530, the operation modality manager 540, and the rendering engine 550 are shown as residing on a single device (e.g., the processing device 110), it should be understood that in other implementations, any combination of the data obtainer 242, the mapper and locator engine 244, the data transmitter 246, the privacy architecture 508, the object tracking engine 510, the eye tracking engine 512, the body/head pose tracking engine 514, the content selector 522, the content manager 530, the operation modality manager 540, and the rendering engine 550 may be located in separate computing devices.

In some implementations, the functions and/or components of the processing device 110 are combined with or provided by the electronic device 120 shown below in FIG. 3. Moreover, FIG. 2 is intended more as a functional description of the various features which be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
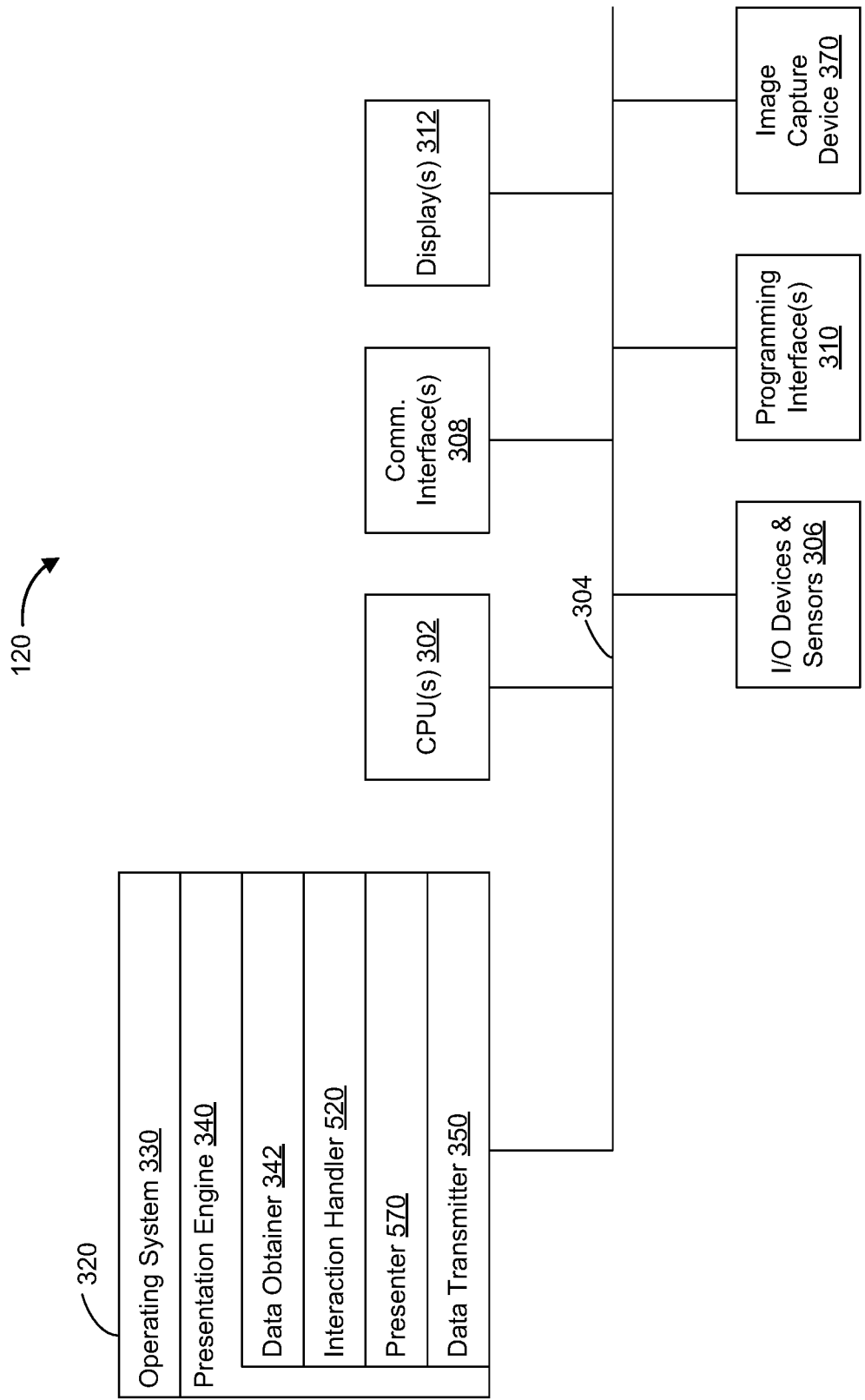
FIG. 3 is a block diagram of an example electronic device in accordance with some implementations.

FIG. 3 is a block diagram of an example of the electronic device 120 (e.g., a mobile phone, tablet, laptop, near-eye system, wearable computing device, or the like) in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the electronic device 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more displays 312, an image capture device 370) (e.g., one or more optional interior-and/or exterior-facing image sensors), a memory 320), and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a magnetometer, a thermometer, one or more physiological sensors (e.g., blood pressure monitor, heart rate monitor, blood oximetry monitor, blood glucose monitor, etc.), one or more microphones, one or more speakers, a haptics engine, a heating and/or cooling unit, a skin shear engine, one or more depth sensors (e.g., structured light, time-of-flight, LiDAR, or the like), a localization and mapping engine, an eye tracking engine, a body/head pose tracking engine, a hand/limb/finger/extremity tracking engine, a camera pose tracking engine, or the like.

In some implementations, the one or more displays 312 are configured to present the XR environment to the user. In some implementations, the one or more displays 312 are also configured to present flat video content to the user (e.g., a 2-dimensional or "flat" AVI, FLV, WMV, MOV, MP4, or the like file associated with a TV episode or a movie, or live video pass-through of the physical environment 105). In some implementations, the one or more displays 312 correspond to touchscreen displays. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more displays 312 correspond to diffractive, reflective, polarized, holographic, etc. waveguide displays. For example, the electronic device 120 includes a single display. In another example, the electronic device 120 includes a display for each eye of the user. In some implementations, the one or more displays 312 are capable of presenting AR and VR content. In some implementations, the one or more displays 312 are capable of presenting AR or VR content.

In some implementations, the image capture device 370 correspond to one or more RGB cameras (e.g., with a complementary metal-oxide-semiconductor (CMOS) image sensor or a charge-coupled device (CCD) image sensor), IR image sensors, event-based cameras, and/or the like. In some implementations, the image capture device 370) includes a lens assembly, a photodiode, and a front-end architecture. In some implementations, the image capture device 370 includes exterior-facing and/or interior-facing image sensors.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and a presentation engine 340.

The operating system 330 includes procedures for handling various basic system services and for performing hardware dependent tasks. In some implementations, the presentation engine 340 is configured to present media items and/or XR content to the user via the one or more displays 312. To that end, in various implementations, the presentation engine 340 includes a data obtainer 342, a presenter 570, an interaction handler 520, and a data transmitter 350.

In some implementations, the data obtainer 342 is configured to obtain data (e.g., presentation data such as rendered image frames associated with the user interface or the XR environment, input data, user interaction data, head tracking information, camera pose tracking information, eye tracking information, hand/limb/finger/extremity tracking information, sensor data, location data, etc.) from at least one of the I/O devices and sensors 306 of the electronic device 120, the processing device 110, and the remote input devices. To that end, in various implementations, the data obtainer 342 includes instructions and/or logic therefor, and heuristics and metadata therefor.

In some implementations, the interaction handler 520 is configured to detect user interactions with the presented A/V content and/or XR content (e.g., gestural inputs detected via hand/extremity tracking, eye gaze inputs detected via eye tracking, voice commands, etc.). To that end, in various implementations, the interaction handler 520 includes instructions and/or logic therefor, and heuristics and metadata therefor.

In some implementations, the presenter 570 is configured to present and update A/V content and/or XR content (e.g., the rendered image frames associated with the user interface or the XR environment 128 including the VA(s), the XR content, one or more UI elements associated with the XR content, and/or the like) via the one or more displays 312. To that end, in various implementations, the presenter 570 includes instructions and/or logic therefor, and heuristics and metadata therefor.

In some implementations, the data transmitter 350 is configured to transmit data (e.g., presentation data, location data, user interaction data, head tracking information, camera pose tracking information, eye tracking information, hand/limb/finger/extremity tracking information, etc.) to at least the processing device 110. To that end, in various implementations, the data transmitter 350 includes instructions and/or logic therefor, and heuristics and metadata therefor.

Although the data obtainer 342, the interaction handler 520, the presenter 570, and the data transmitter 350 are shown as residing on a single device (e.g., the electronic device 120), it should be understood that in other implementations, any combination of the data obtainer 342, the interaction handler 520, the presenter 570, and the data transmitter 350 may be located in separate computing devices.

Moreover, FIG. 3 is intended more as a functional description of the various features which be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 4:
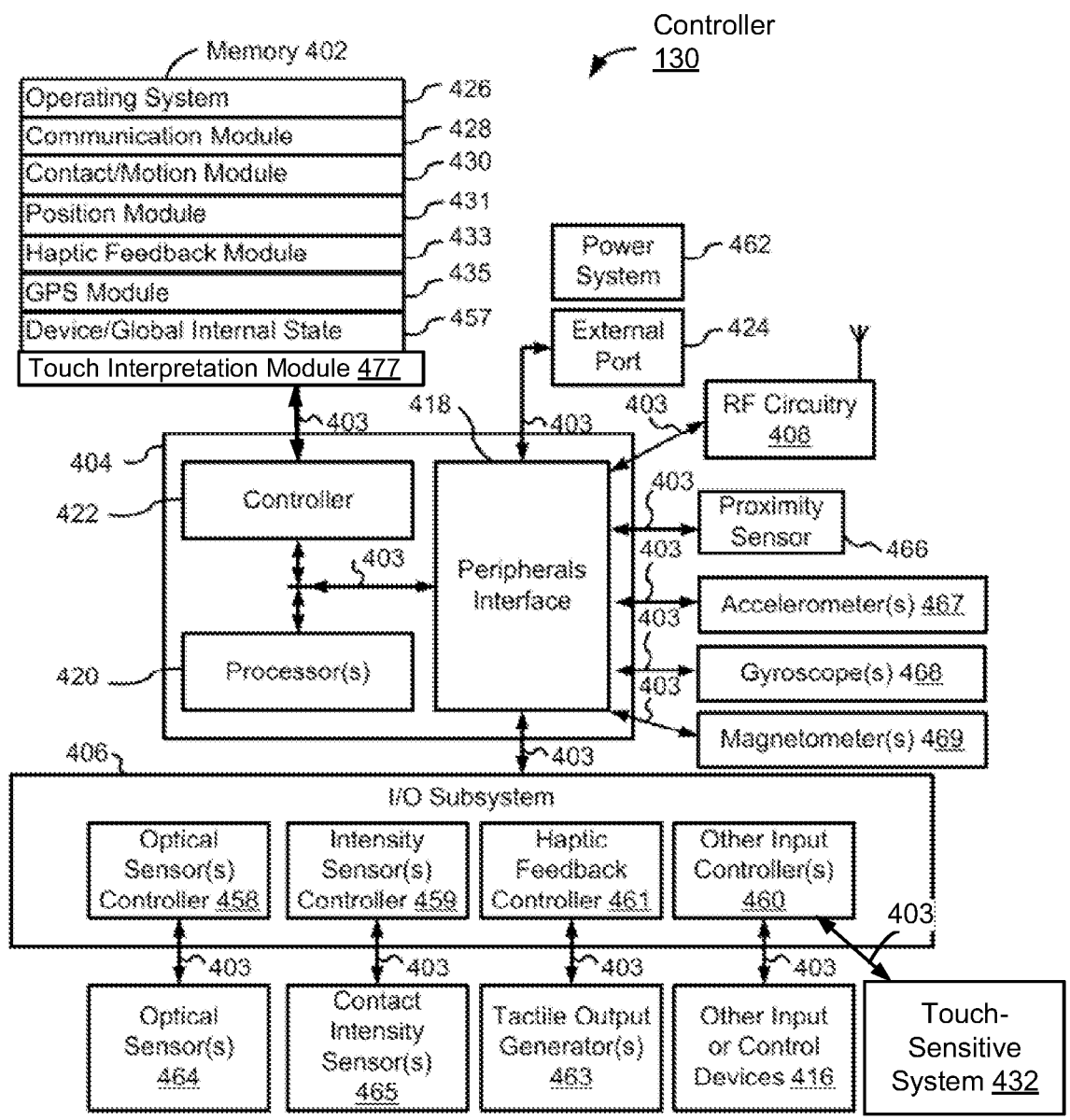
FIG. 4 is a block diagram of an example control device in accordance with some implementations.

FIG. 4 is a block diagram of an exemplary controller 130 in accordance with some implementations. The controller 130 is sometimes simply called a stylus. The controller 130 includes non-transitory memory 402 (which optionally includes one or more computer readable storage mediums), a memory controller 422, one or more processing units (CPUs) 420, a peripherals interface 418, RF circuitry 408, an input/output (I/O) subsystem 406, and other input or control devices 416. The controller 130 optionally includes an external port 424 and one or more optical sensors 464. The controller 130 optionally includes one or more contact intensity sensors 465 for detecting the intensity of contacts of the controller 130 on the electronic device 120 (e.g., when the controller 130 is used with a touch-sensitive surface such the display 122 of the electronic device 120) or on other surfaces (e.g., a desk surface). The controller 130 optionally includes one or more tactile output generators 463 for generating tactile outputs on the controller 130. These components optionally communicate over one or more communication buses or signal lines 403.

It should be appreciated that the controller 130 is only one example of an electronic stylus, and that the controller 130 optionally has more or fewer components than shown, optionally combines two or more components, or optionally has a different configuration or arrangement of the components. The various components shown in FIG. 4 are implemented in hardware, software, firmware, or a combination thereof, including one or more signal processing and/or application specific integrated circuits.

As shown in FIG. 1, the controller 130 includes a first end 176 and a second end 177. In various embodiments, the first end 176 corresponds to a tip of the controller 130 (e.g., the tip of a pencil) and the second end 177 corresponds to the opposite or bottom end of the controller 130 (e.g., the eraser of the pencil).

As shown in FIG. 1, the controller 130 includes a touch-sensitive surface 175 to receive touch inputs from the user 149. In some implementations, the touch-sensitive surface 175 corresponds to a capacitive touch element. The controller 130 includes a sensor or set of sensors that detect inputs from the user based on haptic and/or tactile contact with the touch-sensitive surface 175. In some implementations, the controller 130 includes any of a plurality of touch sensing technologies now known or later developed, including but not limited to capacitive, resistive, infrared, and surface acoustic wave technologies, as well as other proximity sensor arrays or other elements for determining one or more points of contact with the touch-sensitive surface 175. Because the controller 130 includes a variety of sensors and types of sensors, the controller 130 can detect a variety of inputs from the user 149. In some implementations, the one or more sensors can detect a single touch input or successive touch inputs in response to a user tapping once or multiple times on the touch-sensitive surface 175. In some implementations, the one or more sensors can detect a swipe input on the controller 130 in response to the user stroking along the touch-sensitive surface 175 with one or more fingers. In some implementations, if the speed with which the user strokes along the touch-sensitive surface 175 breaches a threshold, the one or more sensors detect a flick input rather than a swipe input.

The controller 130 also includes one or more sensors that detect orientation (e.g., angular position) and/or movement of the controller 130, such as one or more accelerometers 467, one or more gyroscopes 468, one or more magnetometers 469, and/or the like. The one or more sensors can detect a variety of rotational movements of the controller 130 by the user, including the type and direction of the rotation. For example, the one or more sensors can detect the user rolling and/or twirling the controller 130, and can detect the direction (e.g., clockwise or counterclockwise) of the rolling/twirling. In some implementations, the detected input depends on the angular position of the first end 176 and the second end 177 of the controller 130 relative to the electronic device 120, the world-at-large, a physical surface or object within the physical environment 105, a virtual surface or object within the XR environment 128. or the like. For example, in some implementations, if the controller 130 is substantially perpendicular to the electronic device and the second end 177 (e.g., the eraser) is nearer to the electronic device, then contacting the surface of the electronic device with the second end 177 results in an erase operation. On the other hand, if the controller 130 is substantially perpendicular to the electronic device and the first end 176 (e.g., the tip) is nearer to the electronic device, then contacting the surface of the electronic device with the first end 176 results in a marking operation.

The memory 402 optionally includes high-speed random-access memory and optionally also includes non-volatile memory, such as one or more flash memory devices, or other non-volatile solid-state memory devices. Access to the memory 402 by other components of the controller 130, such as the CPU(s) 420 and the peripherals interface 418, is, optionally, controlled by the memory controller 422.

The peripherals interface 418 can be used to couple input and output peripherals of the stylus to the CPU(s) 420 and the memory 402. The one or more processors 420 run or execute various software programs and/or sets of instructions stored in the memory 402 to perform various functions for the controller 130 and to process data. In some implementations, the peripherals interface 418, the CPU(s) 420, and the memory controller 422 are, optionally, implemented on a single chip, such as chip 404. In some other embodiments, they are, optionally, implemented on separate chips.

The RF (radio frequency) circuitry 408 receives and sends RF signals, also called electromagnetic signals. The RF circuitry 408 converts electrical signals to/from electromagnetic signals and communicates with the processing device 110, the electronic device 120, and/or the like, communications networks, and/or other communications devices via the electromagnetic signals. The RF circuitry 408 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 408 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPA), long term evolution (LTE), near field communication (NFC), wideband code division multiple access (W-CDMA), code division multiple access (CDMA), time division multiple access (TDMA), BLUETOOTH, Wireless Fidelity (Wi-Fi) (e.g., IEEE 802.11a, IEEE 802.11ac, IEEE 802.11ax, IEEE 802.11b, IEEE 802.11g and/or IEEE 802.11n), or any other suitable communication protocol, including communication protocols not yet developed as of the filing date of this document.

The I/O subsystem 406 couples input/output peripherals on the controller 130, such as the other input or control devices 416, with the peripherals interface 418. The I/O subsystem 406 optionally includes the optical sensor controller 458, the intensity sensor controller 459, the haptic feedback controller 461, and the one or more input controllers 460 for other input or control devices. The one or more input controllers 460 receive/send electrical signals from/to the other input or control devices 416. The other input or control devices 416 optionally include physical buttons (e.g., push buttons, rocker buttons, etc.), dials, slider switches, click wheels, and so forth. In some alternate embodiments, the input controller(s) 460 are, optionally, coupled with any (or none) of the following: an infrared port and/or a USB port.

The controller 130 also includes a power system 462 for powering the various components. The power system 462 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management, and distribution of power in portable devices and/or portable accessories.

The controller 130 optionally also includes one or more optical sensors 464. FIG. 4 shows an optical sensor coupled with optical sensor controller 458 in I/O subsystem 406. The one or more optical sensors 464 optionally include charge-coupled device (CCD) or complementary metal-oxide semiconductor (CMOS) phototransistors. The one or more optical sensors 464 receive light from the environment, projected through one or more lens, and converts the light to data representing an image.

The controller 130 optionally also includes one or more contact intensity sensors 465. FIG. 4 shows a contact intensity sensor coupled with intensity sensor controller 459 in the I/O subsystem 406. The contact intensity sensors 465 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) relative to a surface or relative to a grasp of the user 149). The contact intensity sensors 465 receive contact intensity information (e.g., pressure information or a proxy for pressure information) from the environment. In some implementations, at least one contact intensity sensor is collocated with, or proximate to, a tip of the controller 130. In some implementations, at least one contact intensity sensor is collocated with, or proximate to, the body of the controller 130.

The controller 130 optionally also includes one or more proximity sensors 466. FIG. 4 shows the one or more proximity sensors 466 coupled with the peripherals interface 418. Alternately, the one or more proximity sensors 466 are coupled with the input controller 460 in the I/O subsystem 406. In some implementations, the one or more proximity sensors 466 determine proximity of the controller 130 to an electronic device (e.g., the electronic device 120).

The controller 130 optionally also includes one or more tactile output generators 463. FIG. 4 shows a tactile output generator coupled with a haptic feedback controller 461 in the I/O subsystem 406. The one or more tactile output generator(s) 463 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the electronic device). The one or more tactile output generator(s) 463 receive tactile feedback generation instructions from the haptic feedback module 433 and generates tactile outputs on the controller 130 that are capable of being sensed by a user of the controller 130. In some implementations, at least one tactile output generator is collocated with, or proximate to, a length (e.g., a body or a housing) of the controller 130 and, optionally, generates a tactile output by moving the controller 130 vertically (e.g., in a direction parallel to the length of the controller 130) or laterally (e.g., in a direction normal to the length of the controller 130).

The controller 130 optionally also includes one or more accelerometers 467, one or more gyroscopes 468, and/or one or more magnetometers 469 (e.g., as part of an inertial measurement unit (IMU)) for obtaining information concerning the location and positional state of controller 130. FIG. 4 shows sensors 467, 468, and 469 coupled with the peripherals interface 418. Alternately, the sensors 467, 468, and 469 are, optionally, coupled with an input controller 460 in the I/O subsystem 406. The controller 130 optionally includes a GPS (or GLONASS or other global navigation system) receiver (not shown) for obtaining information concerning the location of the controller 130.

The controller 130 includes a touch-sensitive system 432. The touch-sensitive system 432 detects inputs received at the touch-sensitive surface 175. These inputs include the inputs discussed herein with respect to the touch-sensitive surface 175 of the controller 130. For example, the touch-sensitive system 432 can detect tap inputs, twirl inputs, roll inputs, flick inputs, swipe inputs, and/or the like. The touch-sensitive system 432 coordinates with a touch interpretation module 477 in order to decipher the particular kind of touch input received at the touch-sensitive surface 175 (e.g., twirl/roll/flick/swipe/etc.).

In some implementations, the software components stored in the memory 402 include an operating system 426, a communication module (or set of instructions) 428, contact/motion module (or set of instructions) 430, a position module (or set of instructions) 431, and a Global Positioning System (GPS) module (or set of instructions) 435. Furthermore, in some implementations, the memory 402 stores a device/global internal state 457, as shown in FIG. 4. Moreover, the memory 402 includes the touch interpretation module 477. The device/global internal state 457 includes one or more of: sensor state, including information obtained from the stylus's various sensors and other input or control devices 416: positional state, including information regarding the position and/or orientation of the controller 130 (e.g., translational and/or rotational values) and location information concerning the location of the controller 130 (e.g., determined by the GPS module 435).

The operating system 426 (e.g., iOS, Darwin, RTXC, LINUX, UNIX, OS X, WINDOWS, or an embedded operating system such as VxWorks) includes various software components and/or drivers for controlling and managing general system tasks (e.g., memory management, power management, etc.) and facilitates communication between various hardware and software components. The communication module 428 optionally facilitates communication with other devices over one or more external ports 424 and also includes various software components for handling data received by the RF circuitry 408 and/or an external port 424. The external port 424 (e.g., Universal Serial Bus (USB), FIREWIRE, etc.) is adapted for coupling directly to other devices or indirectly over a network (e.g., the Internet, wireless LAN, etc.). In some implementations, some functions or operations of the controller 130 are provided by the processing device 110 and/or the electronic device 120.

The contact/motion module 430 optionally detects contact with the controller 130 and other touch-sensitive devices of controller 130 (e.g., buttons or other touch-sensitive components of the controller 130). The contact/motion module 430 includes software components for performing various operations related to detection of contact (e.g., detection of a tip of the stylus with a touch-sensitive display, such as the display 122 of the electronic device 120, or with another surface, such as a desk surface), such as determining if contact has occurred (e.g., detecting a touch-down event), determining an intensity of the contact (e.g., the force or pressure of the contact or a substitute for the force or pressure of the contact), determining if there is movement of the contact and tracking the movement (e.g., across the display 122 of the electronic device 120), and determining if the contact has ceased (e.g., detecting a lift-off event or a break in contact). In some implementations, the contact/motion module 430 receives contact data from the I/O subsystem 406. Determining movement of the point of contact, which is represented by a series of contact data, optionally includes determining speed (magnitude), velocity (magnitude and direction), and/or an acceleration (a change in magnitude and/or direction) of the point of contact. As noted above, in some implementations, one or more of these operations related to detection of contact are performed by the electronic device 120 or the processing device 110 (in addition to or in place of the stylus using the contact/motion module 430).

The contact/motion module 430 optionally detects a gesture input by controller 130. Different gestures with the controller 130 have different contact patterns (e.g., different motions, timings, and/or intensities of detected contacts). Thus, a gesture is, optionally, detected by detecting a particular contact pattern. For example, detecting a single tap gesture includes detecting a touch-down event followed by detecting a lift-off event at the same position (or substantially the same position) as the touch-down event (e.g., at the position of an icon). As another example, detecting a swipe gesture includes detecting a touch-down event followed by detecting one or more stylus-dragging events, and subsequently followed by detecting a lift-off event. As noted above, in some implementations, gesture detection is performed by the electronic device using contact/motion module 430 (in addition to or in place of the stylus using contact/motion module 430).

The position module 431, in conjunction with the one or more accelerometers 467, the one or more gyroscopes 468, and/or the one or more magnetometers 469, optionally detects positional information concerning the stylus, such as the attitude of the controller 130 (e.g., roll, pitch, and/or yaw) in a particular frame of reference. The position module 431, in conjunction with the one or more accelerometers 467, the one or more gyroscopes 468, and/or the one or more magnetometers 469, optionally detects movement gestures, such as flicks, taps, and rolls of the controller 130. The position module 431 includes software components for performing various operations related to detecting the position of the stylus and detecting changes to the position of the stylus in a particular frame of reference. In some implementations, the position module 431 detects the positional state of the controller 130 relative to the physical environment 105 or the world-at-large and detects changes to the positional state of the controller 130.

The haptic feedback module 433 includes various software components for generating instructions used by the one or more tactile output generators 463 to produce tactile outputs at one or more locations on the controller 130 in response to user interactions with the controller 130. The GPS module 435 determines the location of the controller 130 and provides this information for use in various applications (e.g., to applications that provide location-based services such as an application to find missing devices and/or accessories).

The touch interpretation module 477 coordinates with the touch-sensitive system 432 in order to determine (e.g., decipher or identify) the type of touch input received at the touch-sensitive surface 175 of the controller 130. For example, the touch interpretation module 477 determines that the touch input corresponds to a swipe input (as opposed to a tap input) if the user strokes a sufficient distance across the touch-sensitive surface 175 of the controller 130 in a sufficiently short amount of time. As another example, the touch interpretation module 477 determines that the touch input corresponds to a flick input (as opposed to a swipe input) if the speed with which user strokes across the touch-sensitive surface 175 of the controller 130 is sufficiently faster than the speed corresponding to a swipe input. The threshold speeds of strokes can be preset and can be changed. In various embodiments, the pressure and/or force with which the touch is received at the touch-sensitive surface determines the type of input. For example, a light touch can correspond to a first type of input while a harder touch can correspond to a second type of input. In some implementations, the function(s) of the touch interpretation module 477 are provided by the processing device 110 and/or the electronic device 120 such as touch input detection via data from a magnetic sensor or computer vision techniques.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some implementations, the memory 402 optionally stores a subset of the modules and data structures identified above. Furthermore, the memory 402 optionally stores additional modules and data structures not described above.

Figure 5A:
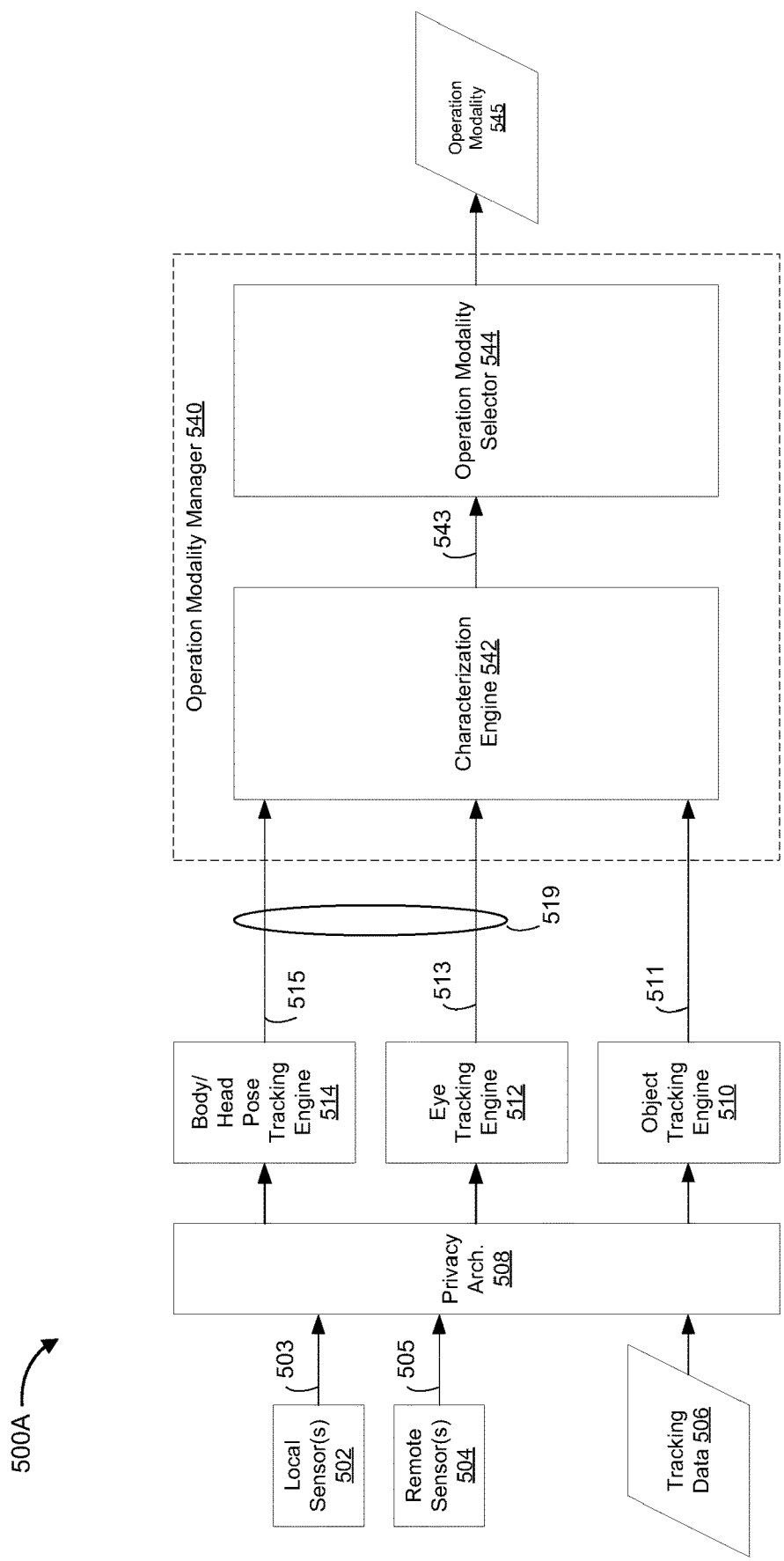
FIG. 5A is a block diagram of a first portion of an example content delivery architecture in accordance with some implementations.
Figure 5B:
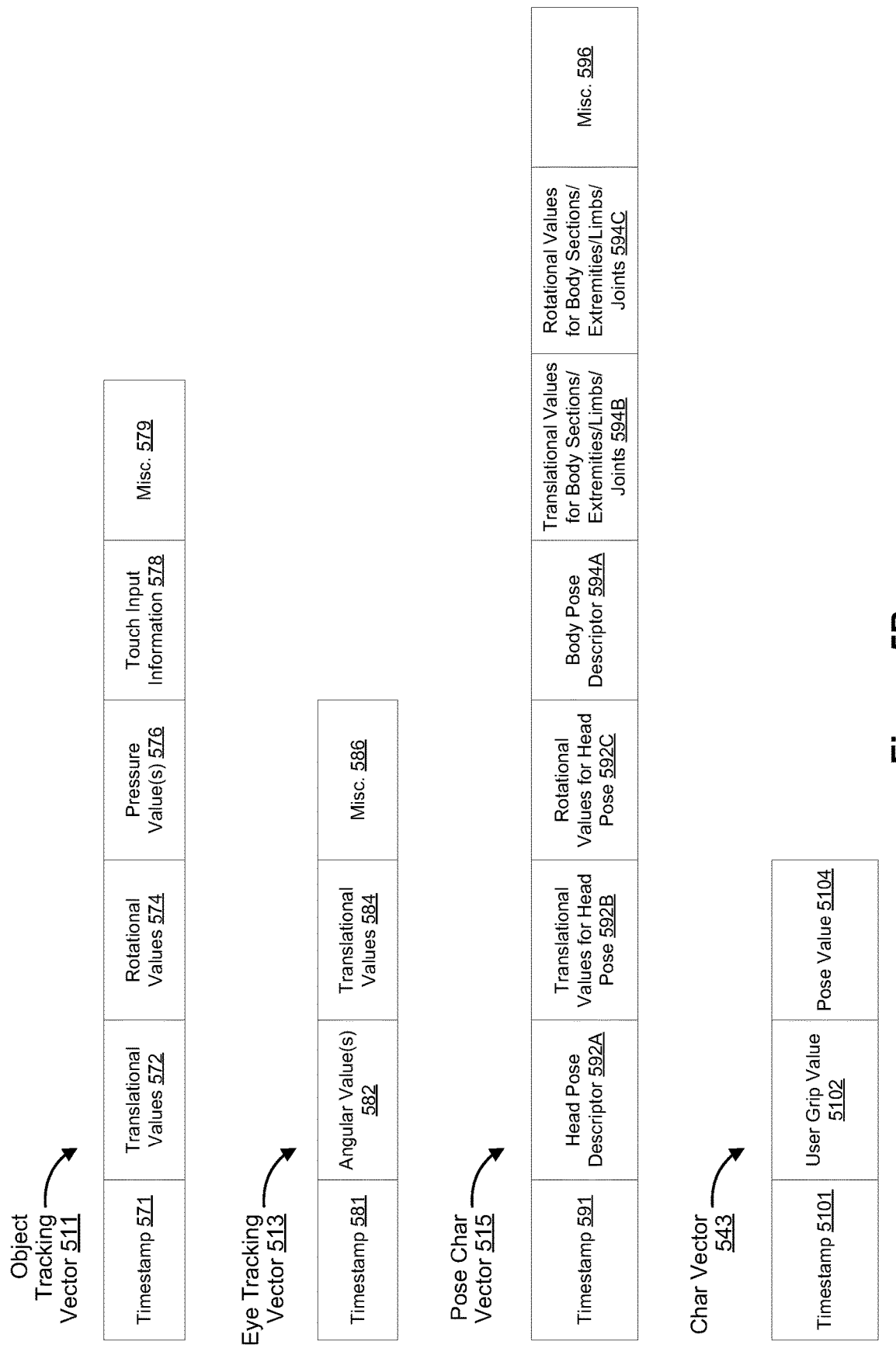
FIG. 5B illustrates example data structures in accordance with some implementations.

FIG. 5A is a block diagram of a first portion 500A of an example content delivery architecture in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the content delivery architecture is included in a computing system such as the processing device 110 shown in FIGS. 1 and 2: the electronic device 120 shown in FIGS. 1 and 3; and/or a suitable combination thereof.

As shown in FIG. 5A, one or more local sensors 502 of the processing device 110, the electronic device 120, and/or a combination thereof obtain local sensor data 503 associated with the physical environment 105. For example, the local sensor data 503 includes images or a stream thereof of the physical environment 105, simultaneous location and mapping (SLAM) information for the physical environment 105 and the location of the electronic device 120 or the user 149 relative to the physical environment 105, ambient lighting information for the physical environment 105, ambient audio information for the physical environment 105, acoustic information for the physical environment 105, dimensional information for the physical environment 105, semantic labels for objects within the physical environment 105, and/or the like. In some implementations, the local sensor data 503 includes un-processed or post-processed information.

Similarly, as shown in FIG. 5A, one or more remote sensors 504 associated with the optional remote input devices within the physical environment 105 obtain remote sensor data 505 associated with the physical environment 105. For example, the remote sensor data 505 includes images or a stream thereof of the physical environment 105, SLAM information for the physical environment 105 and the location of the electronic device 120 or the user 149 relative to the physical environment 105, ambient lighting information for the physical environment 105, ambient audio information for the physical environment 105, acoustic information for the physical environment 105, dimensional information for the physical environment 105, semantic labels for objects within the physical environment 105, and/or the like. In some implementations, the remote sensor data 505 includes un-processed or post-processed information.

As shown in FIG. 5A, tracking data 506 is obtained by at least one of the processing device 110, the electronic device 120, or the controller 130 in order to localize and track the controller 130. As one example, the tracking data 506 includes images or a stream thereof of the physical environment 105 captured by exterior-facing image sensors of the electronic device 120 that includes the controller 130. As another example, the tracking data 506 corresponds to IMU information, accelerometer information, gyroscope information, magnetometer information, and/or the like from integrated sensors of the controller 130.

According to some implementations, the privacy architecture 508 ingests the local sensor data 503, the remote sensor data 505, and the tracking data 506. In some implementations, the privacy architecture 508 includes one or more privacy filters associated with user information and/or identifying information. In some implementations, the privacy architecture 508 includes an opt-in feature where the electronic device 120 informs the user 149 as to what user information and/or identifying information is being monitored and how the user information and/or the identifying information will be used. In some implementations, the privacy architecture 508 selectively prevents and/or limits the content delivery architecture 500A/500B or portions thereof from obtaining and/or transmitting the user information. To this end, the privacy architecture 508 receives user preferences and/or selections from the user 149 in response to prompting the user 149 for the same. In some implementations, the privacy architecture 508 prevents the content delivery architecture 500A/500B from obtaining and/or transmitting the user information unless and until the privacy architecture 508 obtains informed consent from the user 149. In some implementations, the privacy architecture 508 anonymizes (e.g., scrambles, obscures, encrypts, and/or the like) certain types of user information. For example, the privacy architecture 508 receives user inputs designating which types of user information the privacy architecture 508 anonymizes. As another example, the privacy architecture 508 anonymizes certain types of user information likely to include sensitive and/or identifying information, independent of user designation (e.g., automatically).

According to some implementations, the object tracking engine 510 obtains the tracking data 506 after it has been subjected to the privacy architecture 508. In some implementations, the object tracking engine 510 determines/ generates an object tracking vector 511 based on the tracking data 506 and updates the object tracking vector 511 over time.

FIG. 5B shows an example data structure for the object tracking vector 511 in accordance with some implementations. As shown in FIG. 5B, the object tracking vector 511 may correspond to an N-tuple characterization vector or characterization tensor that includes a timestamp 571 (e.g., the most recent time the object tracking vector 511 was updated), one or more translational values 572 for a physical object (e.g., x, y, and z values relative to the physical environment 105, the world-at-large, and/or the like), one or more rotational values 574 for the physical object (e.g., roll, pitch, and yaw values), one or more pressure values 576 associated with the physical object (e.g., a first pressure value associated with contact between an end of the controller 130 and a surface, a second pressure value associated with an amount of pressure exerted on a body of the controller 130 while grasped by the user 149, and/or the like), optional touch input information 578 (e.g., information associated with user touch inputs directed to the touch-sensitive surface 175 of the controller 130), and/or miscellaneous information 579. One of ordinary skill in the art will appreciate that the data structure for the object tracking vector 511 in FIG. 5B is merely an example that may include different information portions in various other implementations and be structured in myriad ways in various other implementations.

According to some implementations, the eye tracking engine 512 obtains the local sensor data 503 and the remote sensor data 505 after it has been subjected to the privacy architecture 508. In some implementations, the eye tracking engine 512 determines/generates an eye tracking vector 513 based on the input data and updates the eye tracking vector 513 over time.

FIG. 5B shows an example data structure for the eye tracking vector 513 in accordance with some implementations. As shown in FIG. 5B, the eye tracking vector 513 may correspond to an N-tuple characterization vector or characterization tensor that includes a timestamp 581 (e.g., the most recent time the eye tracking vector 513 was updated), one or more angular values 582 for a current gaze direction (e.g., roll, pitch, and yaw values), one or more translational values 584 for the current gaze direction (e.g., x, y, and z values relative to the physical environment 105, the world-at-large, and/or the like), and/or miscellaneous information 586. One of ordinary skill in the art will appreciate that the data structure for the eye tracking vector 513 in FIG. 5B is merely an example that may include different information portions in various other implementations and be structured in myriad ways in various other implementations.

For example, the gaze direction indicates a point (e.g., associated with x, y, and z. coordinates relative to the physical environment 105 or the world-at-large), a physical object, or a region of interest (ROI) in the physical environment 105 at which the user 149 is currently looking. As another example, the gaze direction indicates a point (e.g., associated with x, y, and z coordinates relative to the XR environment 128), an XR object, or a region of interest (ROI) in the XR environment 128 at which the user 149 is currently looking.

According to some implementations, the body/head pose tracking engine 514 obtains the local sensor data 503 and the remote sensor data 505 after it has been subjected to the privacy architecture 508. In some implementations, the body/head pose tracking engine 514 determines/generates a pose characterization vector 515 based on the input data and updates the pose characterization vector 515 over time.

FIG. 5B shows an example data structure for the pose characterization vector 515 in accordance with some implementations. As shown in FIG. 5B, the pose characterization vector 515 may correspond to an N-tuple characterization vector or characterization tensor that includes a timestamp 591 (e.g., the most recent time the pose characterization vector 515 was updated), a head pose descriptor 592A (e.g., upward, downward, neutral, etc.), translational values for the head pose 592B, rotational values for the head pose 592C, a body pose descriptor 594A (e.g., standing, sitting, prone, etc.), translational values for body sections/extremities/limbs/joints 594B, rotational values for the body sections/extremities/limbs/joints 594C, and/or miscellaneous information 596. In some implementations, the pose characterization vector 515 also includes information associated with finger/hand/extremity tracking. One of ordinary skill in the art will appreciate that the data structure for the pose characterization vector 515 in FIG. 5B is merely an example that may include different information portions in various other implementations and be structured in myriad ways in various other implementations. According to some implementations, the eye tracking vector 513 and the pose characterization vector 515 are collectively referred to as a user input vector 519.

According to some implementations, the characterization engine 542 obtains the object tracking vector 511, the eye tracking vector 513, and the pose characterization vector 515. In some implementations, the characterization engine 542 determines/generates the characterization vector 543 for the physical object based on the object tracking vector 511, the eye tracking vector 513, and the pose characterization vector 515.

FIG. 5B shows an example data structure for the characterization vector 543 in accordance with some implementations. As shown in FIG. 5B, the characterization vector 543 may correspond to an N-tuple characterization vector or characterization tensor that includes a timestamp 5101 (e.g., the most recent time the characterization vector 543 was updated), a user grip value 5102 associated with the physical object, and a pose value 5104 associated with the physical object. In some implementations, the user grip value 5102 value indicates a manner in which the user 149 grasps the physical object. For example, the user grip value 5102 corresponds to one of a remote-control-esque grip, a wand-esque grip, a writing grip, an inverse writing grip, a handle grip, a thumb top grip, a level-esque grip, a gamepad-esque grip, a flute-esque grip, a fire-starter-esque grip, or the like. In some implementations, the pose value 5104 indicates an orientation or a position of the physical object relative to the user 149, a physical surface, or another object that is detectable via computer vision (CV). For example, the pose value 5104 corresponds to one of a neutral pose, a conductor/wand pose, a writing pose, a surface pose, a near mouth pose, an aimed pose, or the like.

As discussed above, in one example, the physical object corresponds to the controller 130 which includes integrated sensors and is communicatively coupled to the processing device 110. In this example, the controller 130 corresponds to a stylus, a finger-wearable device, a handheld device, or the like. In another example, the physical object corresponds to a proxy object that is not communicatively coupled to the processing device 110.

According to some implementations, the operation modality selector 544 obtains the characterization vector 543 for the physical object and selects a current operation modality 545 for the physical object (when interacting with the XR environment 128) based on the characterization vector 543. As one example, the selected operation modality 545 may correspond to a marking mode when the pose value corresponds to a neutral pose and the user grip value corresponds to a writing utensil-like grip. As another example, the selected operation modality 545 may correspond to an erasing mode when the pose value corresponds to a neutral pose and the user grip value corresponds to an inverse writing utensil-like grip. As yet another example, the selected operation modality 545 may correspond to a dictation mode when the pose value corresponds to a near-mouth pose and the user grip value corresponds to a wand-like grip. As yet another example, the selected operation modality 545 may correspond to a manipulation mode when the pose value corresponds to a neutral pose and the user grip value corresponds to a wand-like grip. As yet another example, the selected operation modality 545 may correspond to a pointing mode when the pose value corresponds to an aimed pose and the user grip value corresponds to a wand-like grip.

Figure 5C:
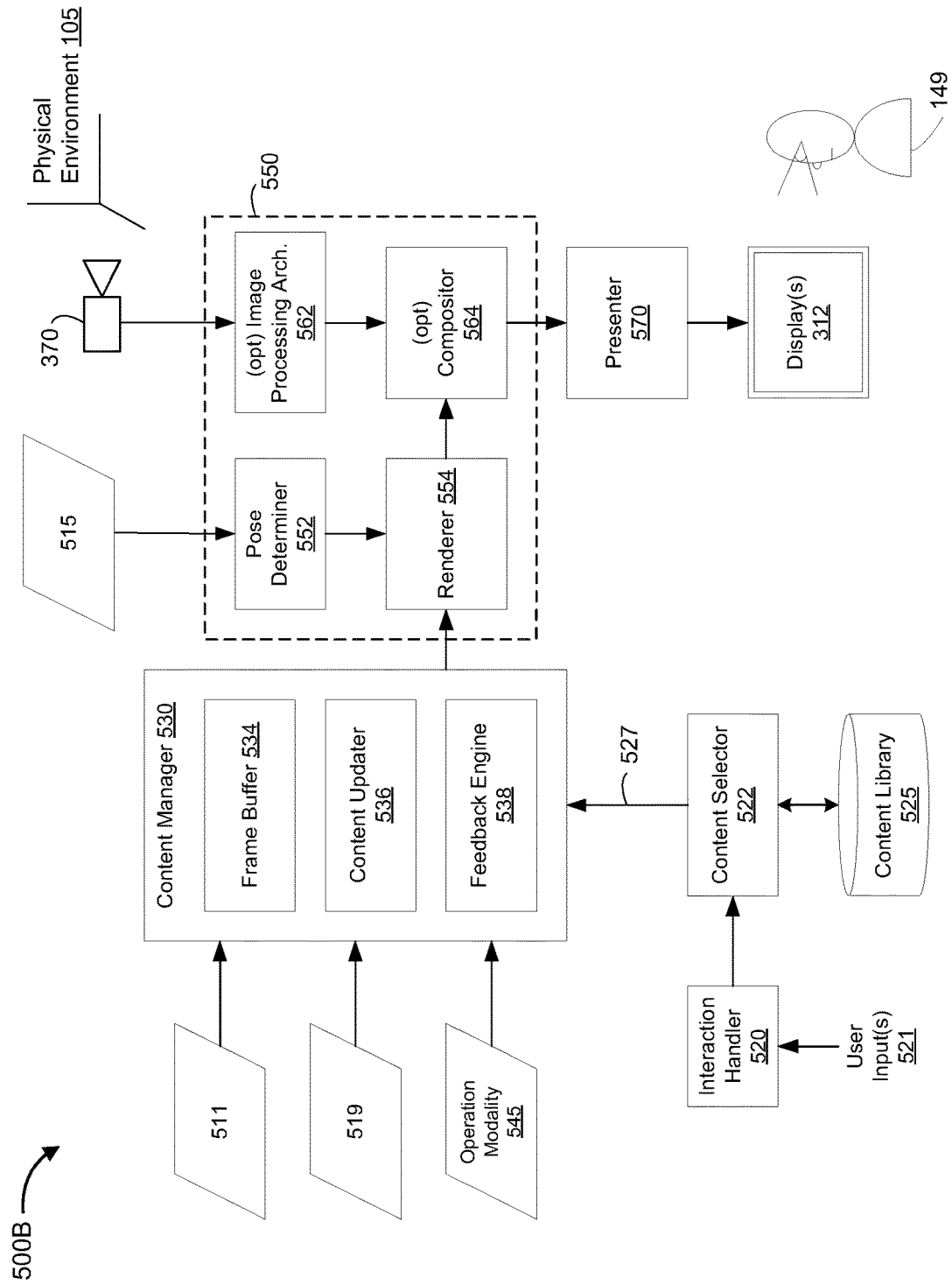
FIG. 5C is a block diagram of a second portion of the example content delivery architecture in accordance with some implementations.

FIG. 5C is a block diagram of a second portion 500B of the example content delivery architecture in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the content delivery architecture is included in a computing system such as the processing device 110 shown in FIGS. 1 and 2; the electronic device 120 shown in FIGS. 1 and 3; and/or a suitable combination thereof. FIG. 5C is similar to and adapted from FIG. 5A. Therefore, similar reference numbers are used in FIGS. 5A and 5C. As such, only the differences between FIGS. 5A and 5C will be described below for the sake of brevity.

According to some implementations, the interaction handler 520 obtains (e.g., receives, retrieves, or detects) one or more user inputs 521 provided by the user 149 that are associated with selecting A/V content, one or more VAs, and/or XR content for presentation. For example, the one or more user inputs 521 correspond to a gestural input selecting XR content from a UI menu detected via hand/extremity tracking, an eye gaze input selecting XR content from the UI menu detected via eye tracking, a voice command selecting XR content from the UI menu detected via a microphone, and/or the like. In some implementations, the content selector 522 selects XR content 527 from the content library 525 based on one or more user inputs 521 (e.g., a voice command, a selection from a menu of XR content items, and/or the like).

In various implementations, the content manager 530 manages and updates the layout, setup, structure, and/or the like for the XR environment 128, including one or more of VAs, XR content, one or more UI elements associated with the XR content, and/or the like, based on the object tracking vector 511, the user input vector 519, the selected operation modality 545, the user inputs 521, and/or the like. To that end, the content manager 530 includes the buffer 534, the content updater 536, and the feedback engine 538.

In some implementations, the buffer 534 includes XR content, a rendered image frame, and/or the like for one or more past instances and/or frames. In some implementations, the content updater 536 modifies the XR environment 128 over time based on the object tracking vector 511, the user input vector 519, the selected operation modality 545, the user inputs 521 associated with modifying and/or manipulating the XR content or VA(s), translational or rotational movement of objects within the physical environment 105, translational or rotational movement of the electronic device 120 (or the user 149), and/or the like. In some implementations, the feedback engine 538 generates sensory feedback (e.g., visual feedback such as text or lighting changes, audio feedback, haptic feedback, etc.) associated with the XR environment 128.

According to some implementations, with reference to the rendering engine 550) in FIG. 5C, the pose determiner 552 determines a current camera pose of the electronic device 120 and/or the user 149 relative to the XR environment 128 and/or the physical environment 105 based at least in part on the pose characterization vector 515. In some implementations, the renderer 554 renders the VA(s), the XR content 527, one or more UI elements associated with the XR content, and/or the like according to the current camera pose relative thereto.

According to some implementations, the optional image processing architecture 562 obtains an image stream from an image capture device 370 including one or more images of the physical environment 105 from the current camera pose of the electronic device 120 and/or the user 149. In some implementations, the image processing architecture 562 also performs one or more image processing operations on the image stream such as warping, color correction, gamma correction, sharpening, noise reduction, white balance, and/or the like. In some implementations, the optional compositor 564 composites the rendered XR content with the processed image stream of the physical environment 105 from the image processing architecture 562 to produce rendered image frames of the XR environment 128. In various implementations, the presenter 570) presents the rendered image frames of the XR environment 128 to the user 149 via the one or more displays 312. One of ordinary skill in the art will appreciate that the optional image processing architecture 562 and the optional compositor 564 may not be applicable for fully virtual environments (or optical see-through scenarios).

Figure 6A:
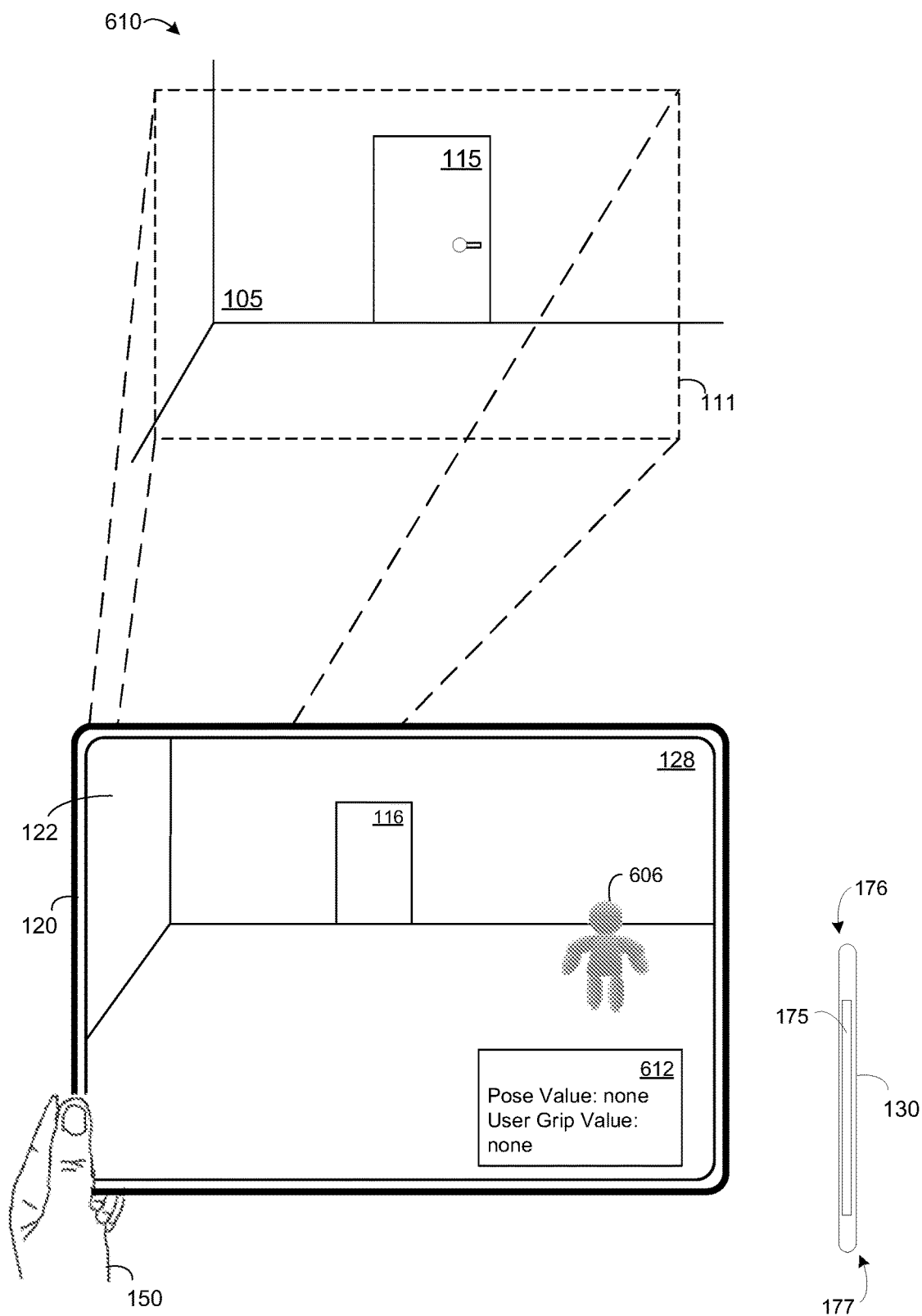
FIGS. 6A-6R illustrate a sequence of instances for a content delivery scenario in accordance with some implementations.
Figure 6B:
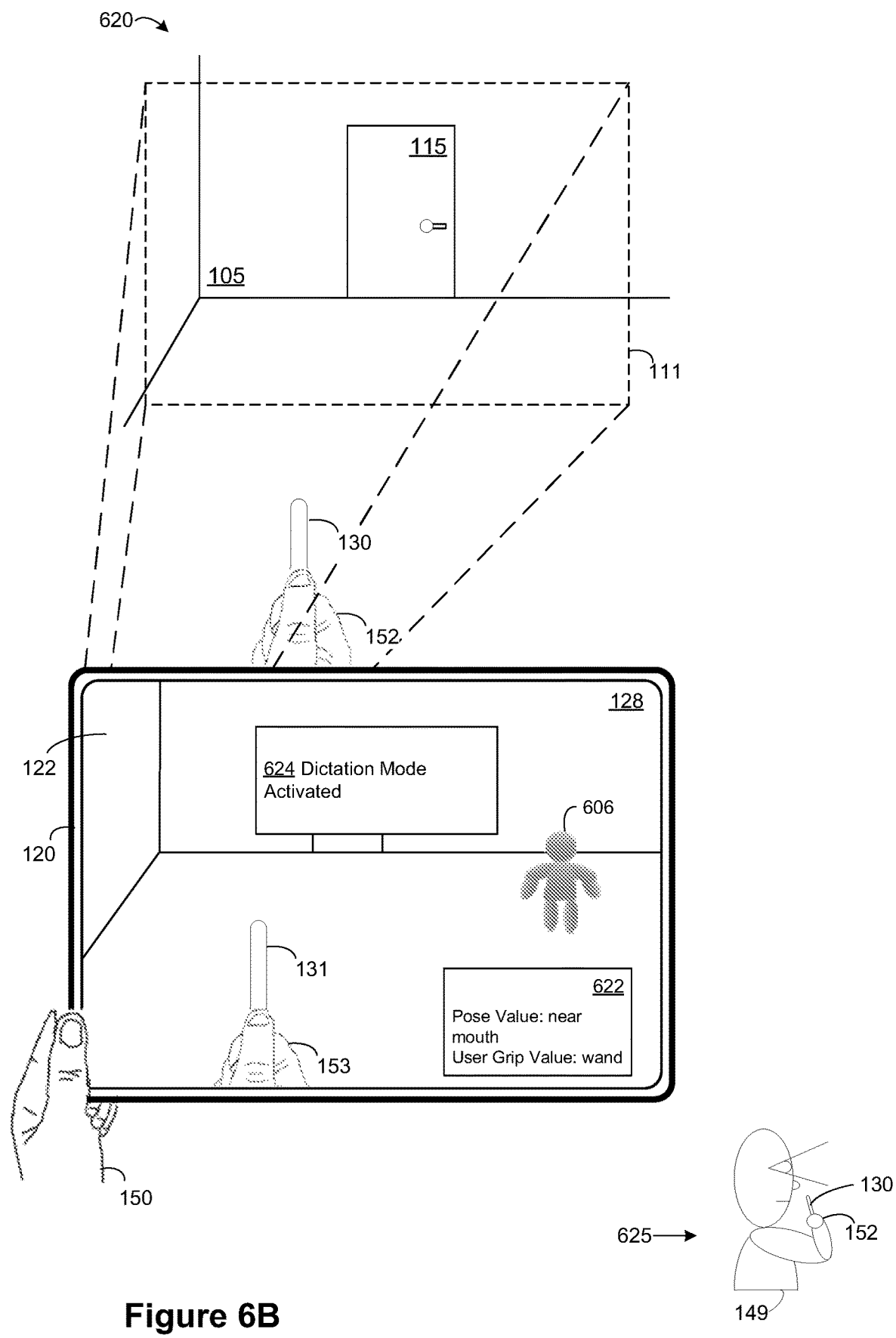
Figure 6C:
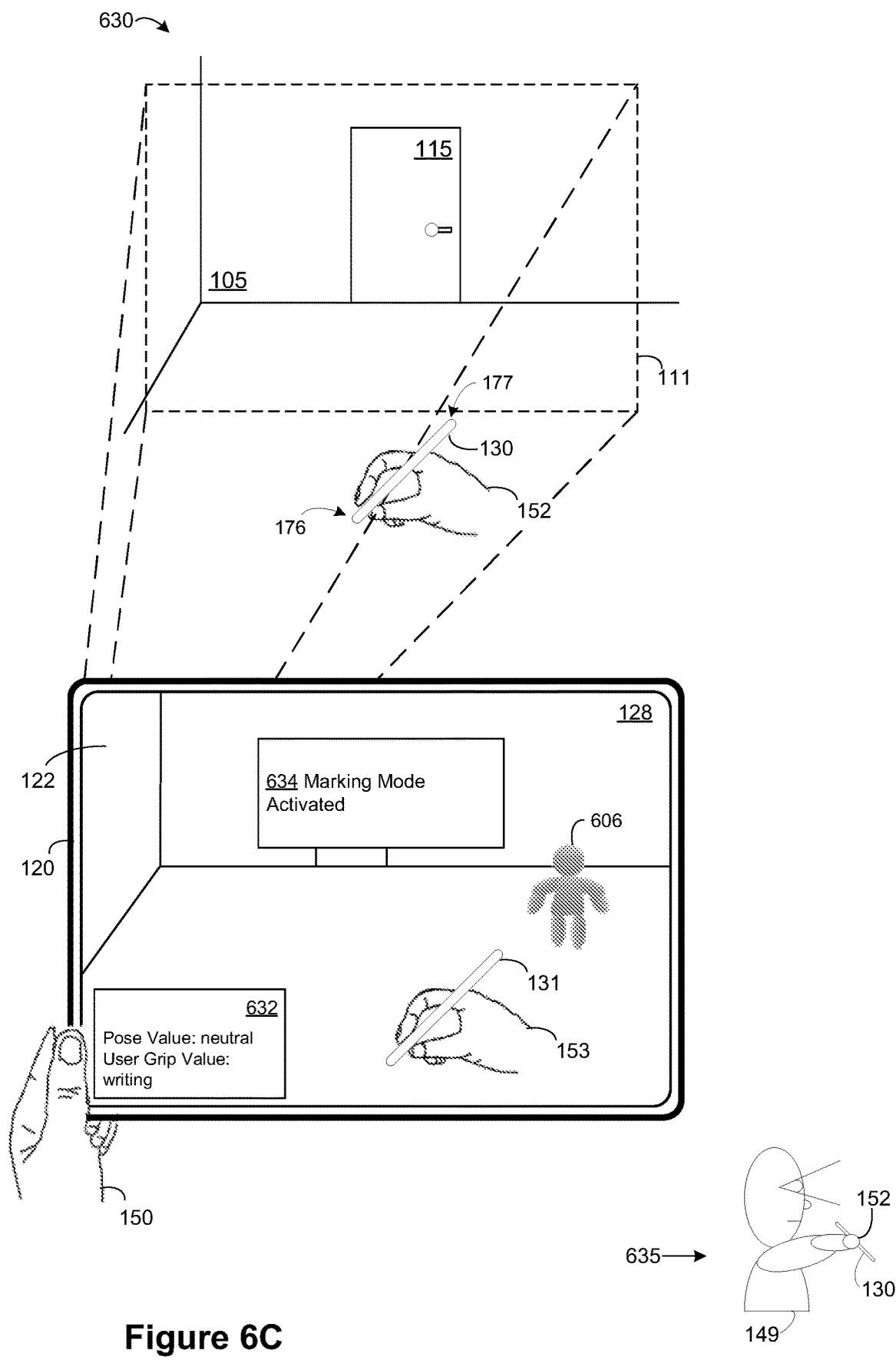
Figure 6D:
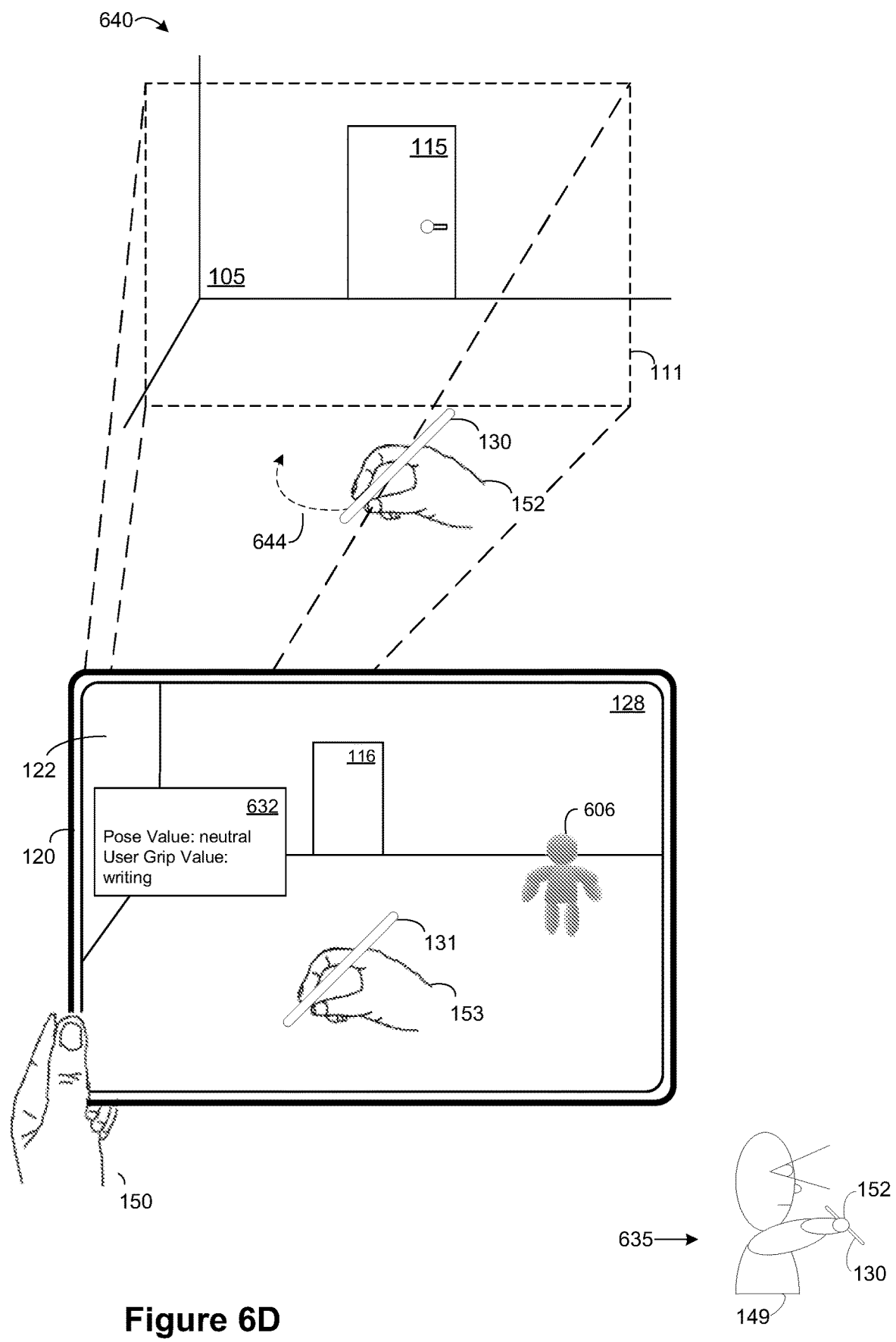
Figure 6E:
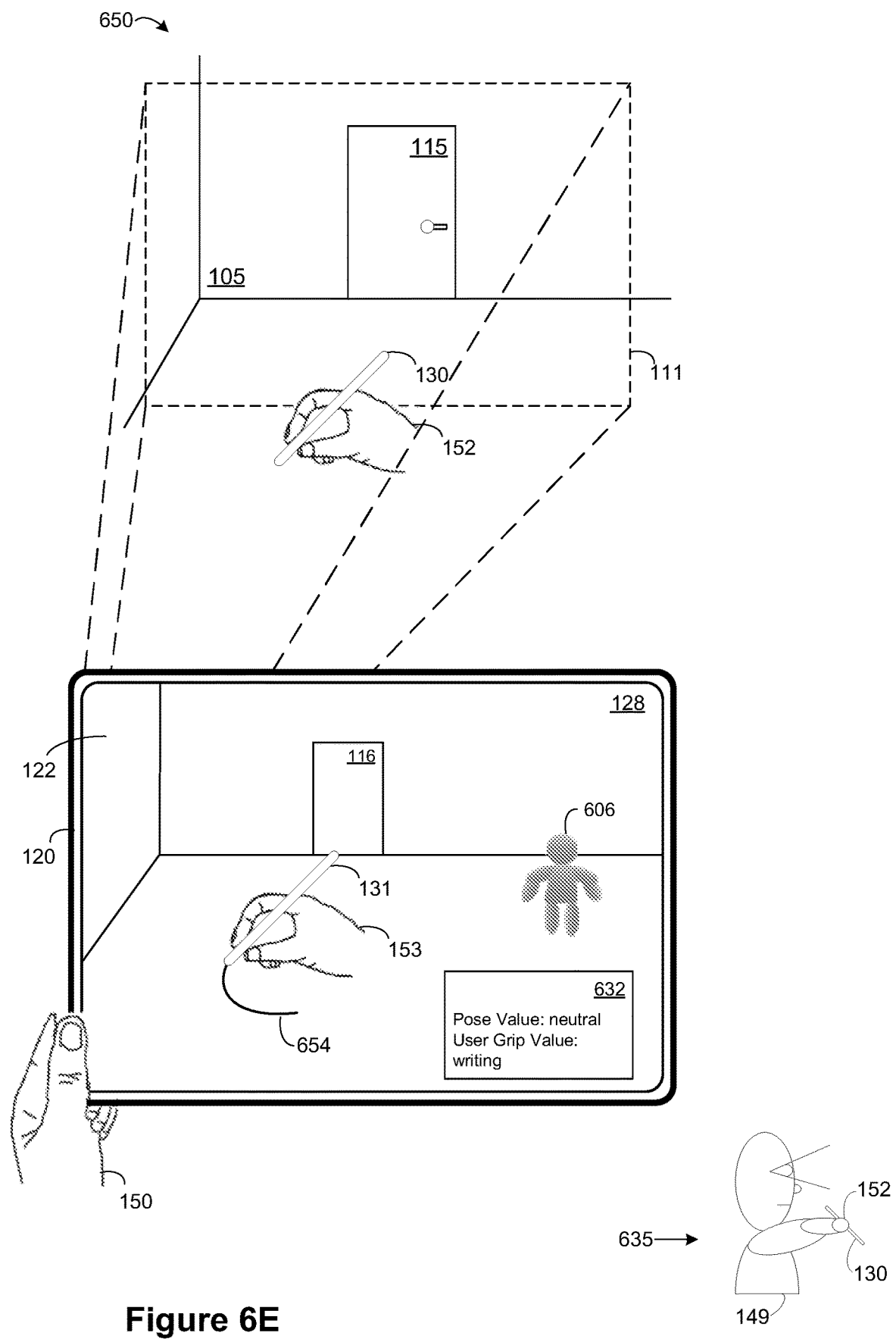
Figure 6F:
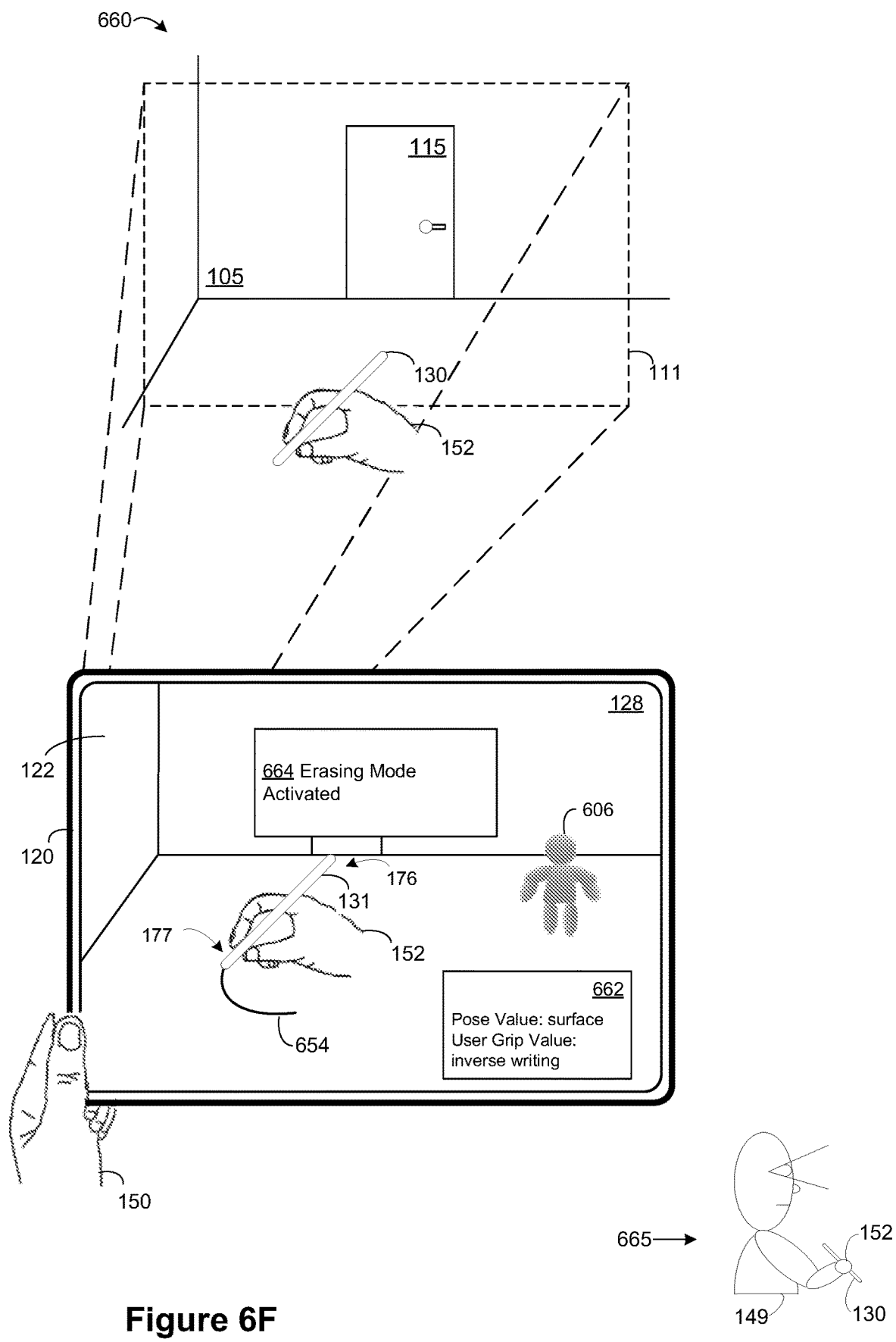
Figure 6G:
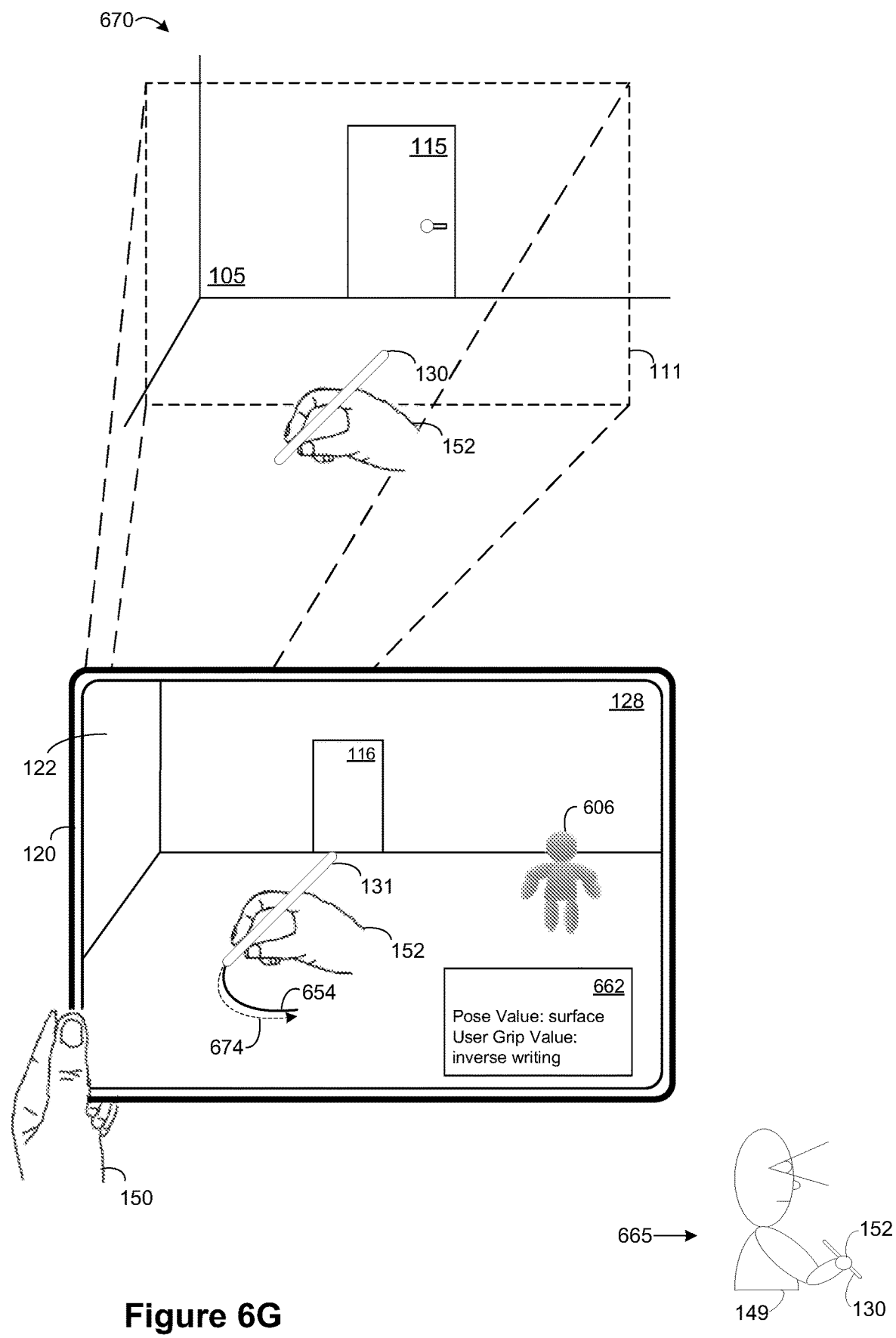
Figure 6H:
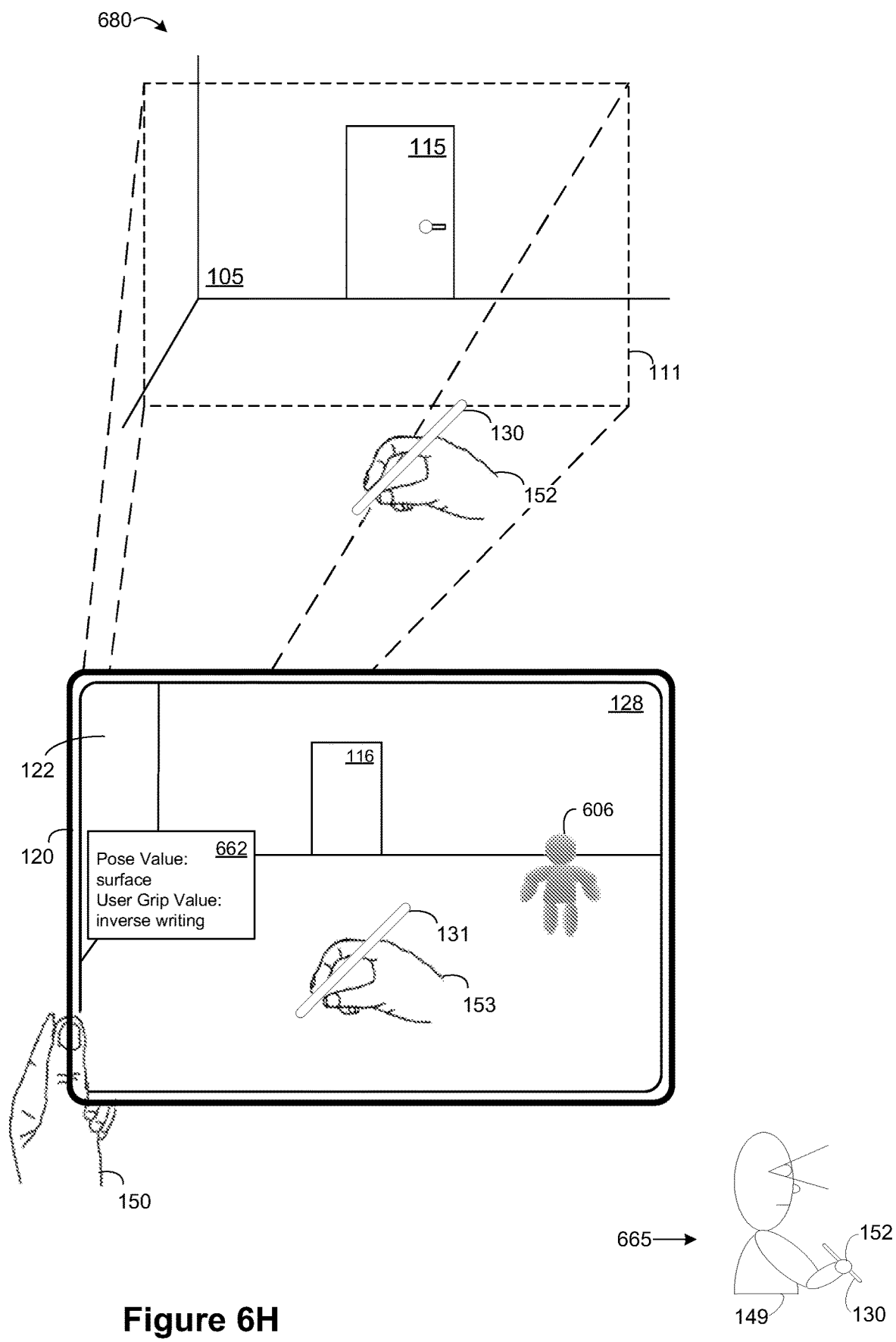
Figure 6I:
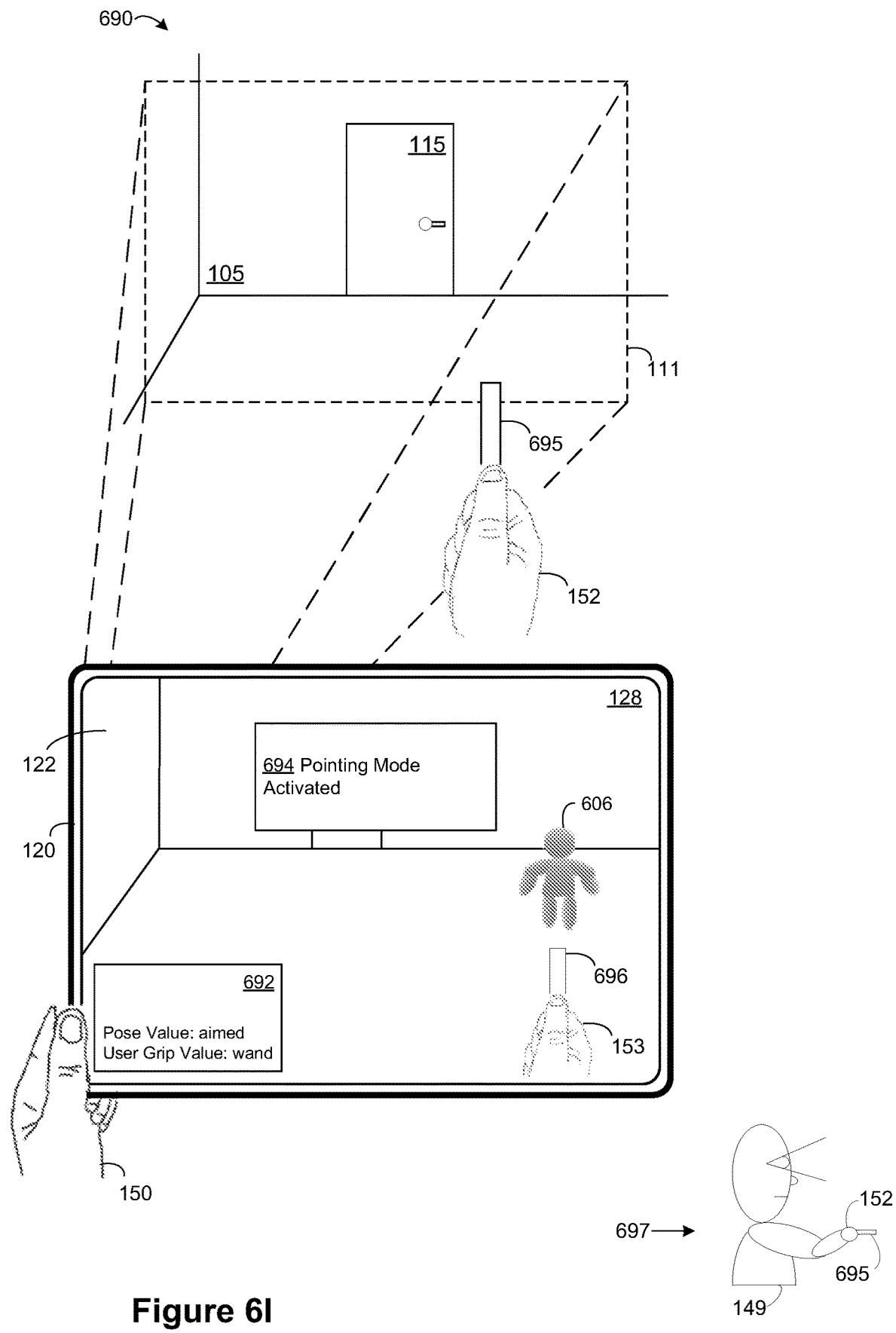
Figure 6J:
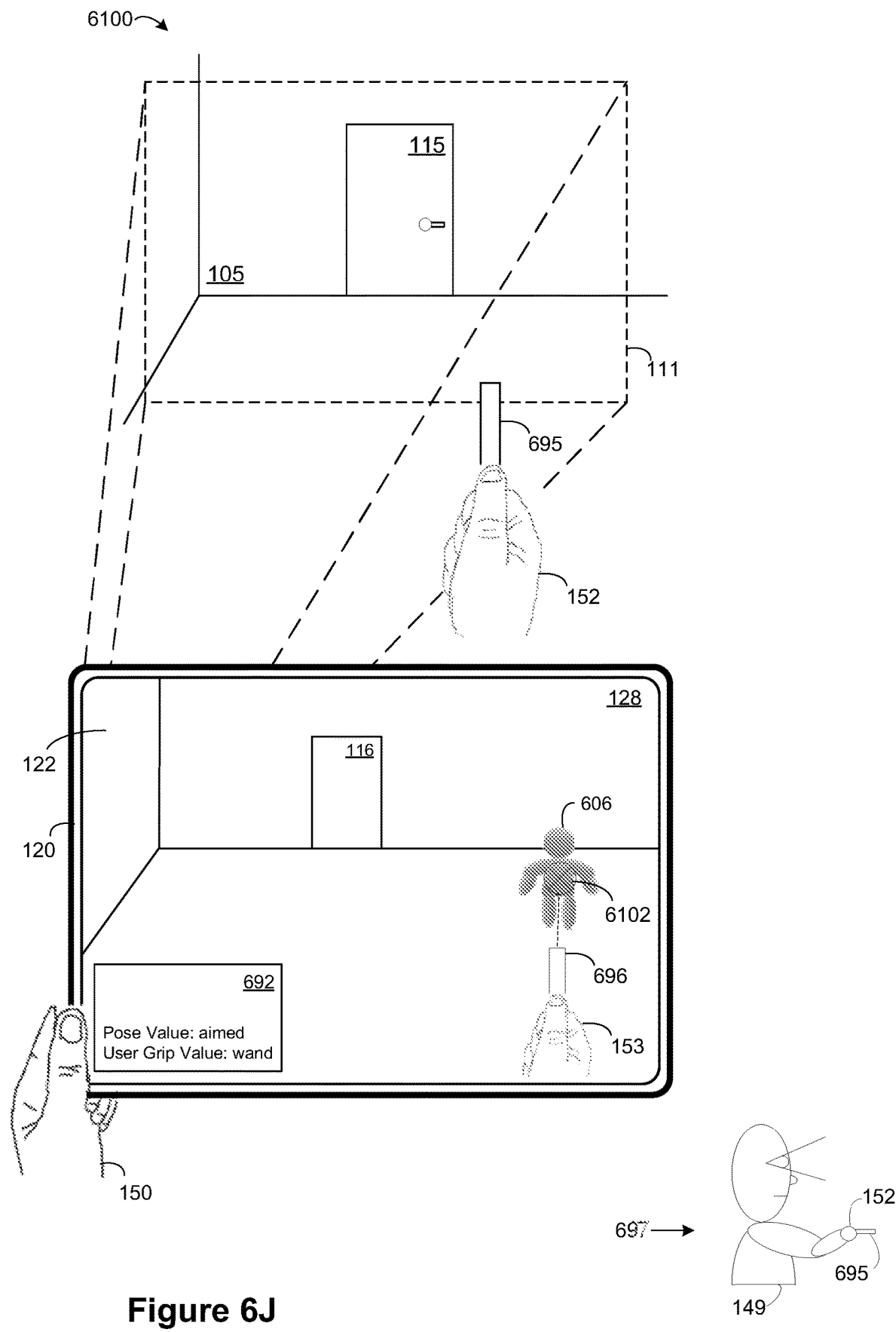
Figure 6K:
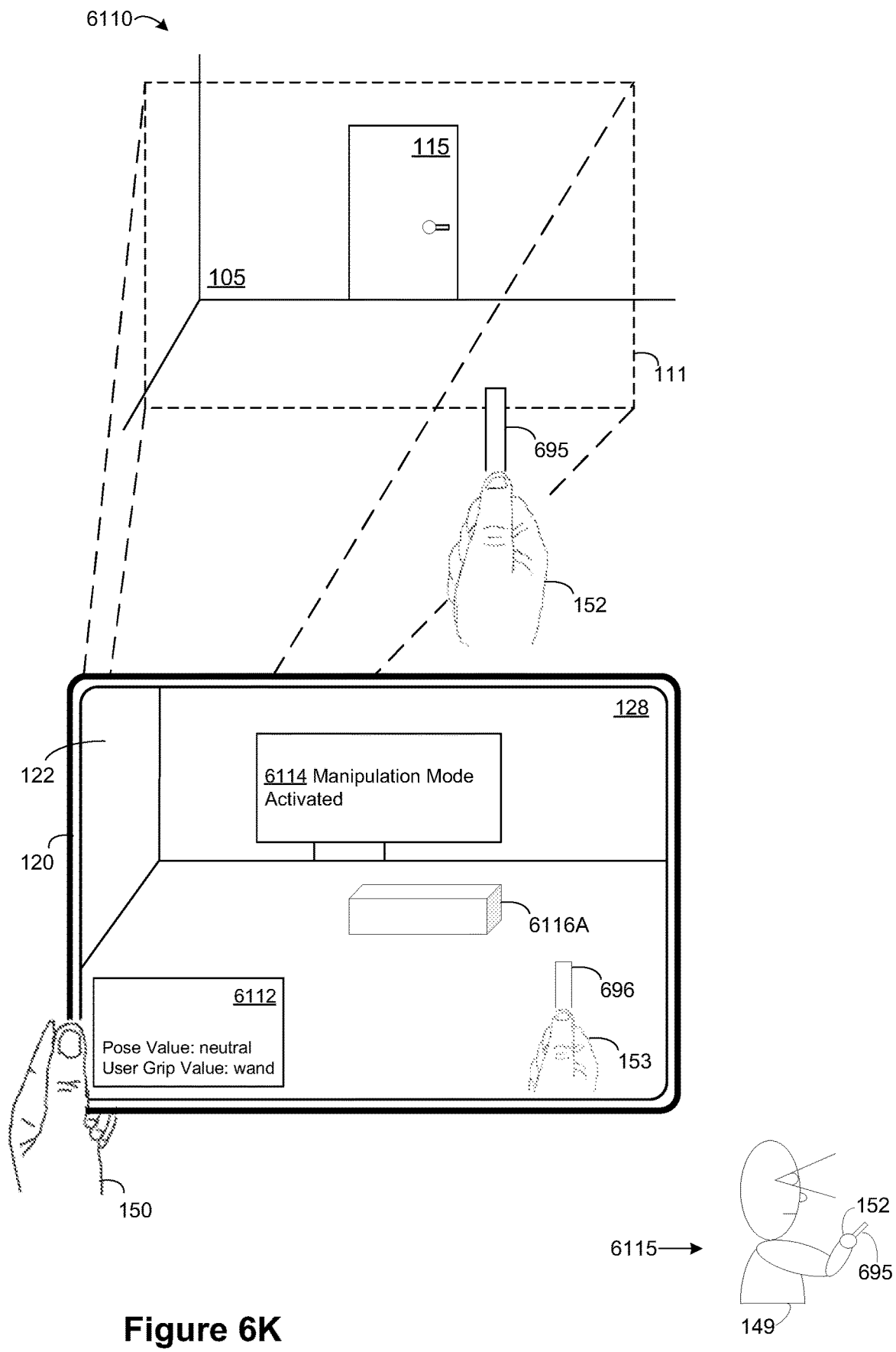
Figure 6L:
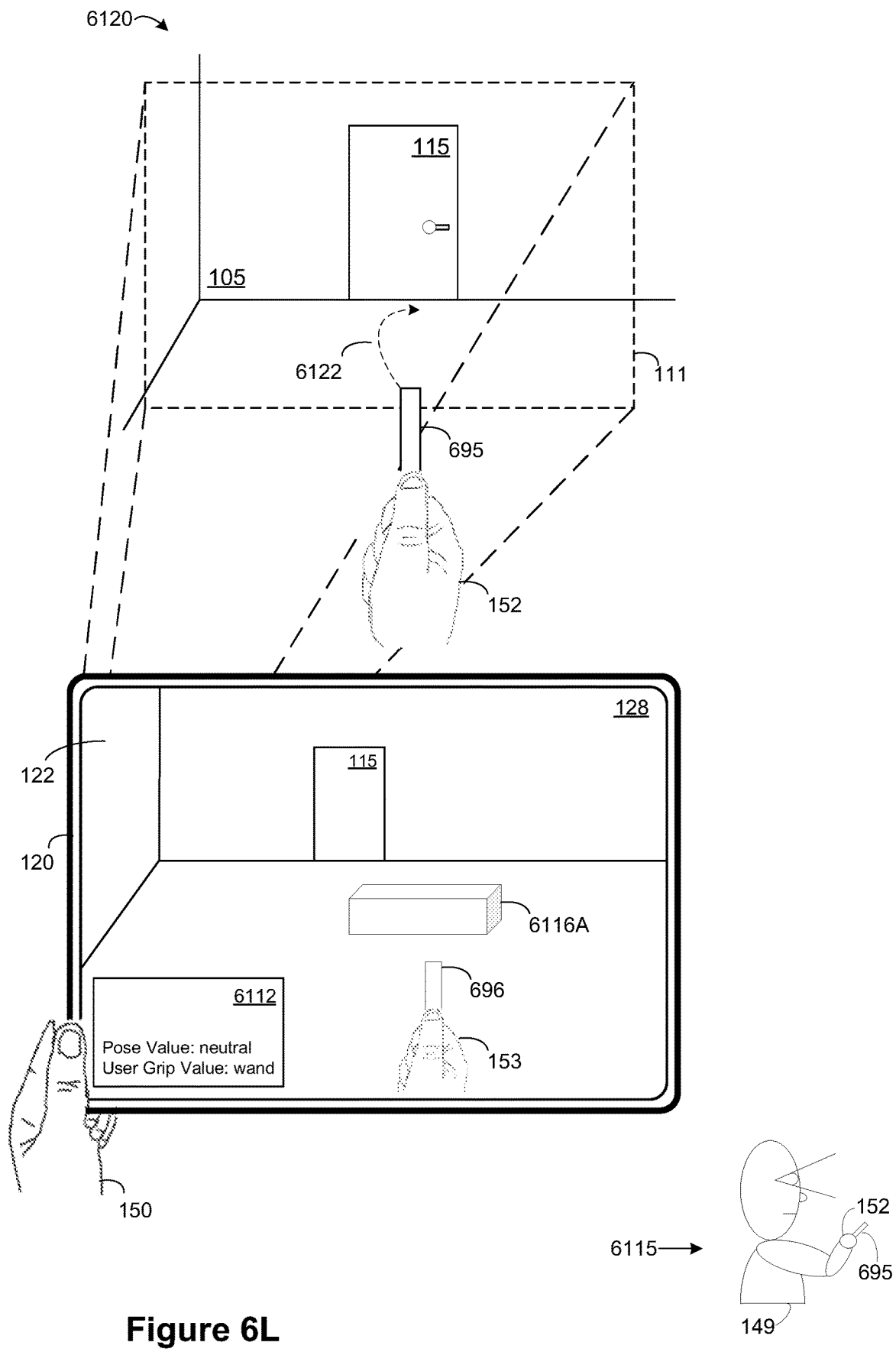
Figure 6M:
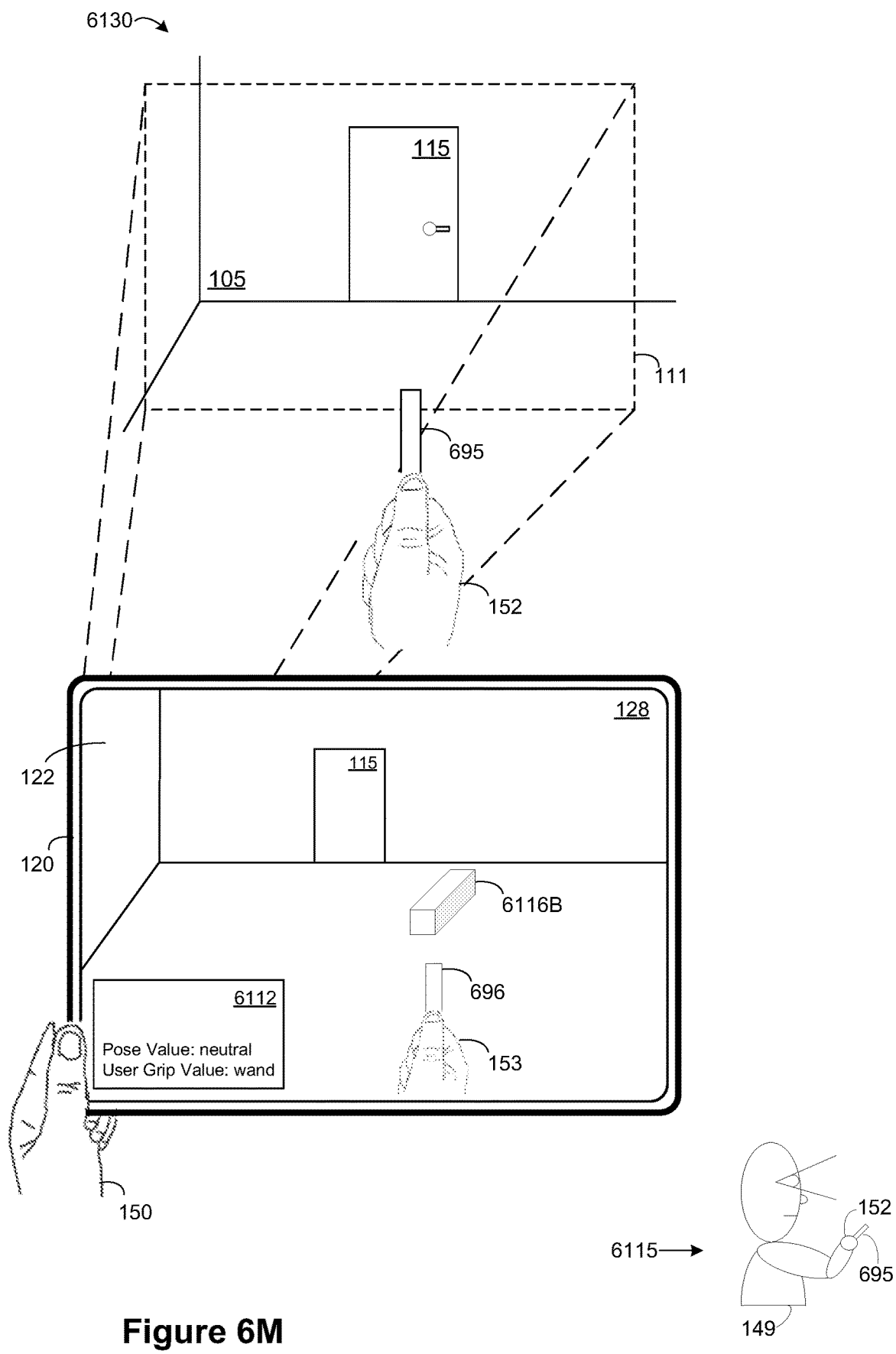
Figure 6N:
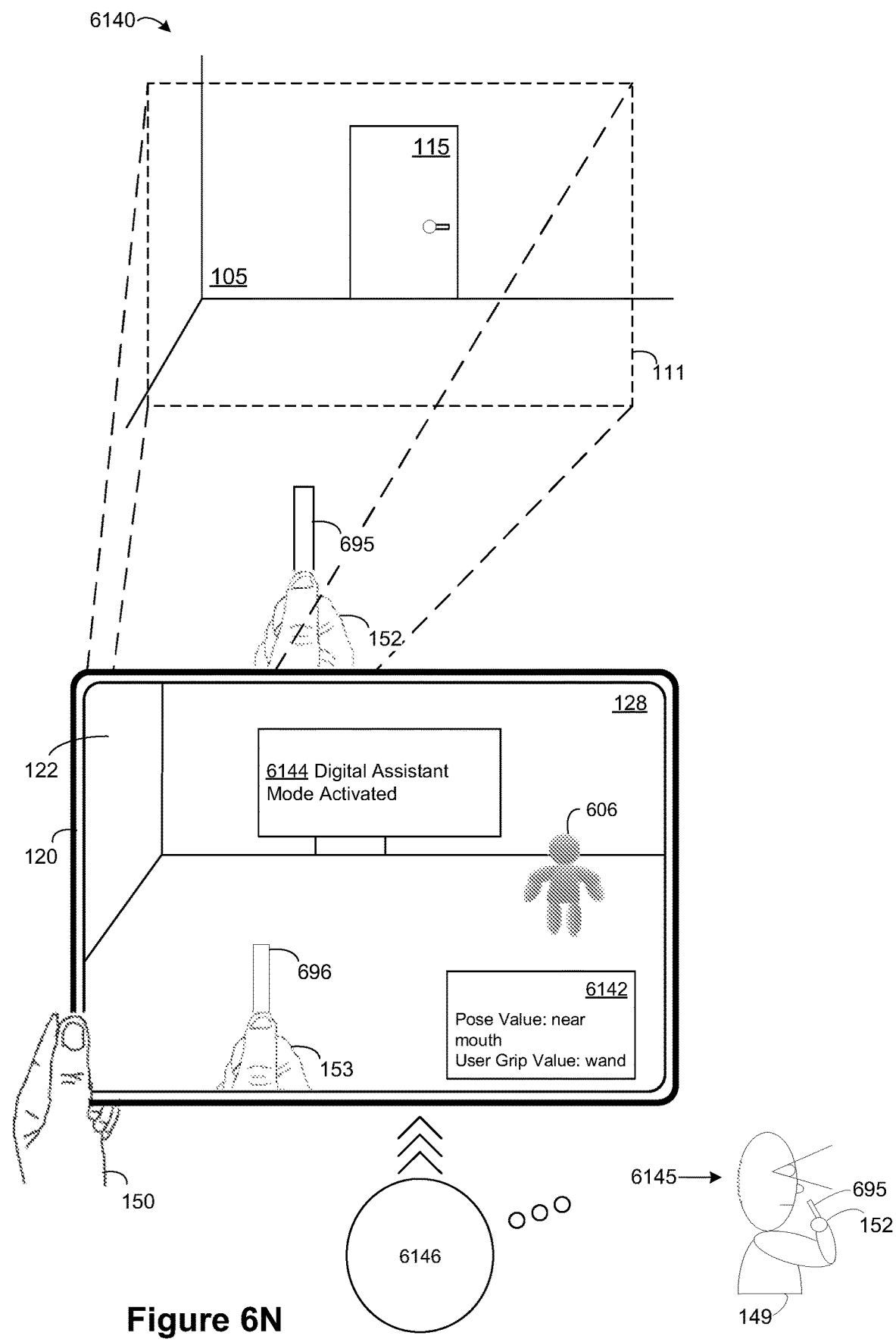

FIGS. 6A-6N illustrate a sequence of instances 610-6140 for a content delivery scenario in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, the sequence of instances 610-6140 are rendered and presented by a computing system such as the processing device 110 shown in FIGS. 1 and 2; the electronic device 120 shown in FIGS. 1 and 3; and/or a suitable combination thereof.

As shown in FIGS. 6A-6N, the content delivery scenario includes a physical environment 105 and an XR environment 128 displayed on the display 122 of the electronic device 120 (e.g., associated with the user 149). The electronic device 120 presents the XR environment 128 to the user 149 while the user 149 is physically present within the physical environment 105 that includes a door 115, which is currently within the FOV 111 of an exterior-facing image sensor of the electronic device 120. As such, in some implementations, the user 149 holds the electronic device 120 in his/her left hand 150 similar to the operating environment 100 in FIG. 1.

In other words, in some implementations, the electronic device 120 is configured to present XR content and to enable optical see-through or video pass-through of at least a portion of the physical environment 105 on the display 122 (e.g., the door 115). For example, the electronic device 120 corresponds to a mobile phone, tablet, laptop, near-eye system, wearable computing device, or the like.

As shown in FIG. 6A, during the instance 610 (e.g., associated with time $T_1$) of the content delivery scenario, the electronic device 120 presents an XR environment 128 including a virtual agent (VA) 606 and a representation 116 of the door 115 within the physical environment 105. As shown in FIG. 6A, the XR environment 128 also includes a visual indicator 612 for the instance 610 with the current pose value (e.g., no current pose value because the controller 130 is currently not being grasped by the user 149) and the current user grip value (e.g., no current user grip value because the controller 130 is currently not being grasped by the user 149). One of ordinary skill in the art will appreciate that the visual indicator 612 is merely an example visualization with the pose and user grip values that may be modified or replaced in various other implementations. As one example, the visual indicator 612 may be a badge, an icon, an audio output, or the like instead of a text notification.

As shown in FIG. 6B, during the instance 620 (e.g., associated with time $T_2$) of the content delivery scenario, the electronic device 120 presents the XR environment 128 including the VA 606, a visual indicator 622 for the instance 620 with the current pose value (e.g., near mouth) and the current user grip value (e.g., wand), and a representation 131 of the controller 130 being held by a representation 153 of the right hand 152 of the user 149 (e.g., video pass-through of the physical environment 105). FIG. 6B includes an illustration of a current body pose 625 of the user 149 for the instance 620 whereby the user 149 is grasping the controller 130 with his/her right hand 152 nearby his/her mouth.

In response to determining that the current pose value corresponds to "near mouth" and that the current user grip value corresponds to "wand," the electronic device 120) selects a dictation mode as the current operation modality for the controller 130 and also displays a notification 624 indicating: "Dictation Mode Activated." As such, while the current operation modality of the controller 130 corresponds to the dictation mode, the user 149 is able to dictate a blurb, a note, content to be displayed within the XR environment 128, or the like. One of ordinary skill in the art will appreciate that the notification 624 is merely an example visualization that may be modified or replaced in various other implementations.

As shown in FIG. 6C, during the instance 630 (e.g., associated with time $T_3$) of the content delivery scenario, the electronic device 120 presents the XR environment 128 including the VA 606, a visual indicator 632 for the instance 630 with the current pose value (e.g., neutral) and the current user grip value (e.g., writing), and the representation 131 of the controller 130 being held by the representation 153 of the right hand 152 of the user 149 (e.g., video pass-through of the physical environment 105). FIGS. 6C-6E include an illustration of a current body pose 635 of the user 149 for the instances 630-650 whereby the user 149 is grasping the controller 130 with his/her right hand 152 in order to write/sketch/draw/mark in space (e.g., in three dimensions).

In response to determining that the current pose value corresponds to "neutral" and that the current user grip value corresponds to "writing," the electronic device 120 selects a marking mode as the current operation modality for the controller 130 and also displays a notification 634 indicating: "Marking Mode Activated." As shown in FIG. 6C, the first end 176 is pointed downward, and the second end 177 is pointed upward relative to gravity. As such, while the current operation modality of the controller 130 corresponds to the marking mode, the user 149 is able to write/sketch/draw/mark in three dimensions, and the electronic device 120 displays corresponding marks within the XR environment 128.

As shown in FIG. 6D, during the instance 640) (e.g., associated with time $T_4$) of the content delivery scenario, the electronic device 120 detects a marking input 644 with the controller 130 in space (e.g., based on the tracking data 506 from the controller 130, computer vision, and/or the like). As shown in FIG. 6E, during the instance 650) (e.g., associated with time $T_5$) of the content delivery scenario, the electronic device 120 displays a mark 654 within the XR environment 128 in response to detecting the marking input 644 in FIG. 6E. For example, the mark 654 corresponds to the shape, displacement, etc. of the marking input 644. In another example, the mark 654 corresponds to a function of the shape, displacement, etc. of the marking input 644 and a weight coefficient (e.g., an amplification value, an attenuation value, or the like).

As shown in FIG. 6F, during the instance 660 (e.g., associated with time $T_6$) of the content delivery scenario, the electronic device 120 presents the XR environment 128 including the VA 606 and a visual indicator 662 for the instance 660 with the current pose value (e.g., surface) and the current user grip value (e.g., inverse writing). FIGS. 6F-6H include an illustration of a current body pose 665 of the user 149 for the instances 660-680 whereby the user 149 is grasping the controller 130 with his/her right hand 152 in order to write/sketch/draw/mark on the display 122 of the electronic device 120.

In response to determining that the current pose value corresponds to "surface" and that the current user grip value corresponds to "inverse writing," the electronic device 120 selects an erasing mode as the current operation modality for the controller 130 and also displays a notification 664 indicating: "Erasing Mode Activated." As shown in FIG. 6F, the second end 177 is pointed downward, and the first end 176 is pointed upward relative to gravity. As such, while the current operation modality of the controller 130 corresponds to the erasing mode, the user 149 is able to remove/erase pixels marks from the XR environment 128.

As shown in FIG. 6G, during the instance 670 (e.g., associated with time $T_7$) of the content delivery scenario, the electronic device 120 detects an erasing input 674 on the display 122 (e.g., a touch-sensitive surface or the like) with the controller 130. As shown in FIG. 6H, during the instance 680 (e.g., associated with time $T_8$) of the content delivery scenario, the electronic device 120 removes the mark 654 within the XR environment 128 in response to detecting the erasing input 674 in FIG. 6G.

As shown in FIG. 6I, during the instance 690 (e.g., associated with time $T_9$) of the content delivery scenario, the electronic device 120 presents the XR environment 128 including the VA 606, a visual indicator 692 for the instance 690 with the current pose value (e.g., aimed) and the current user grip value (e.g., wand), and a representation 696 of a physical object 695 being held by the representation 153 of the right hand 152 of the user 149 (e.g., video pass-through of the physical environment 105). FIGS. 6I and 6J include an illustration of a current body pose 697 of the user 149 for the instances 690 and 6100 whereby the user 149 is grasping the physical object 695 (e.g., a ruler, a stick, the controller 130, or the like) with his/her right hand 152 in order to point in space.

In response to determining that the current pose value corresponds to "aimed" and that the current user grip value corresponds to "wand," the electronic device 120 selects a pointing mode as the current operation modality for the physical object 695 and also displays a notification 694 indicating: "Pointing Mode Activated." As such, while the current operation modality of the physical object 695 corresponds to the pointing mode, the user 149 is able to use the physical object 695 as a laser pointer type device within the XR environment 128. As shown in FIGS. 6I and 6J, the representation 696 of the physical object 695 is pointed towards the VA 606 within the XR environment 128.

As shown in FIG. 6J, during the instance 6100 (e.g., associated with time $T_{10}$) of the content delivery scenario, the electronic device 120 presents a crosshair 6102 (e.g., a focus selector) collocated with the VA 606 within the XR environment 128 in response determining that the representation 696 of the physical object 695 is pointed towards the VA 606 within the XR environment 128 in FIG. 6I.

As shown in FIG. 6K, during the instance 6110 (e.g., associated with time $T_{11}$) of the content delivery scenario, the electronic device 120 presents the XR environment 128 including the VA 606, a first perspective 6116A of XR content (e.g., a frontside of a cube, a box, or the like), a visual indicator 6112 for the instance 6110 with the current pose value (e.g., neutral) and the current user grip value (e.g., wand), and the representation 696 of the physical object 695 being held by the representation 153 of the right hand 152 of the user 149 (e.g., video pass-through of the physical environment 105). FIGS. 6K-6M include an illustration of a current body pose 6115 of the user 149 for the instances 6110-6130 whereby the user 149 is grasping the physical object 695 (e.g., a ruler, a stick, the controller 130, or the like) with his/her right hand 152 in order to manipulate XR content.

In response to determining that the current pose value corresponds to "neutral" and that the current user grip value corresponds to "wand," the electronic device 120 selects a manipulation mode as the current operation modality for the physical object 695 and also displays a notification 6114 indicating: "Manipulation Mode Activated." As such, while the current operation modality of the physical object 695 corresponds to the manipulation mode, the user 149 is able to use the physical object 695 to manipulate (e.g., translate, rotate, and/or the like) the XR content within the XR environment 128.

As shown in FIG. 6L, during the instance 6120 (e.g., associated with time $T_{12}$) of the content delivery scenario, the electronic device 120 detects a manipulation input 6122 with the physical object 695 in space (e.g., based on computer vision and/or the like). For example, the manipulation input 6122 corresponds to a 180° rotation input in a clockwise direction. As shown in FIG. 6M, during the instance 6130 (e.g., associated with time $T_{13}$) of the content delivery scenario, the electronic device 120 rotates the XR content by 180° in the clockwise direction in order to show a second perspective 6116B of XR content (e.g., a backside of the cube, the box, or the like) in response to detecting the manipulation input 6122 in FIG. 6L.

As shown in FIG. 6N, during the instance 6140 (e.g., associated with time $T_{14}$) of the content delivery scenario, the electronic device 120 presents the XR environment 128 including the VA 606, a visual indicator 6142 for the instance 6140 with the current pose value (e.g., near mouth) and the current user grip value (e.g., wand), and the representation 696 of the physical object 695 being held by the representation 153 of the right hand 152 of the user 149 (e.g., video pass-through of the physical environment 105). FIGS. 6N-6R includes an illustration of a current body pose 6145 of the user 149 for the instances 6140-6180 whereby the user 149 is grasping the physical object 695 (e.g., a ruler, a stick, the controller 130, or the like) with his/her right hand 152 nearby his/her mouth.

In response to determining that the current pose value corresponds to "near mouth" and that the current user grip value corresponds to "wand" and in response to detecting a speech input 6146 from the user 149 with a keyword or key phrase (e.g., "Hey, Digital Assistant" or the like), the electronic device 120 selects a digital assistant mode as the current operation modality for the physical object 695 and also displays a notification 6144 indicating: "Digital Assistant Mode Activated." As such, while the current operation modality of the physical object 695 corresponds to the digital assistant mode, the user 149 is able to provide audible commands, search strings, or the like for a digital assistant program to execute.

Figure 6O:
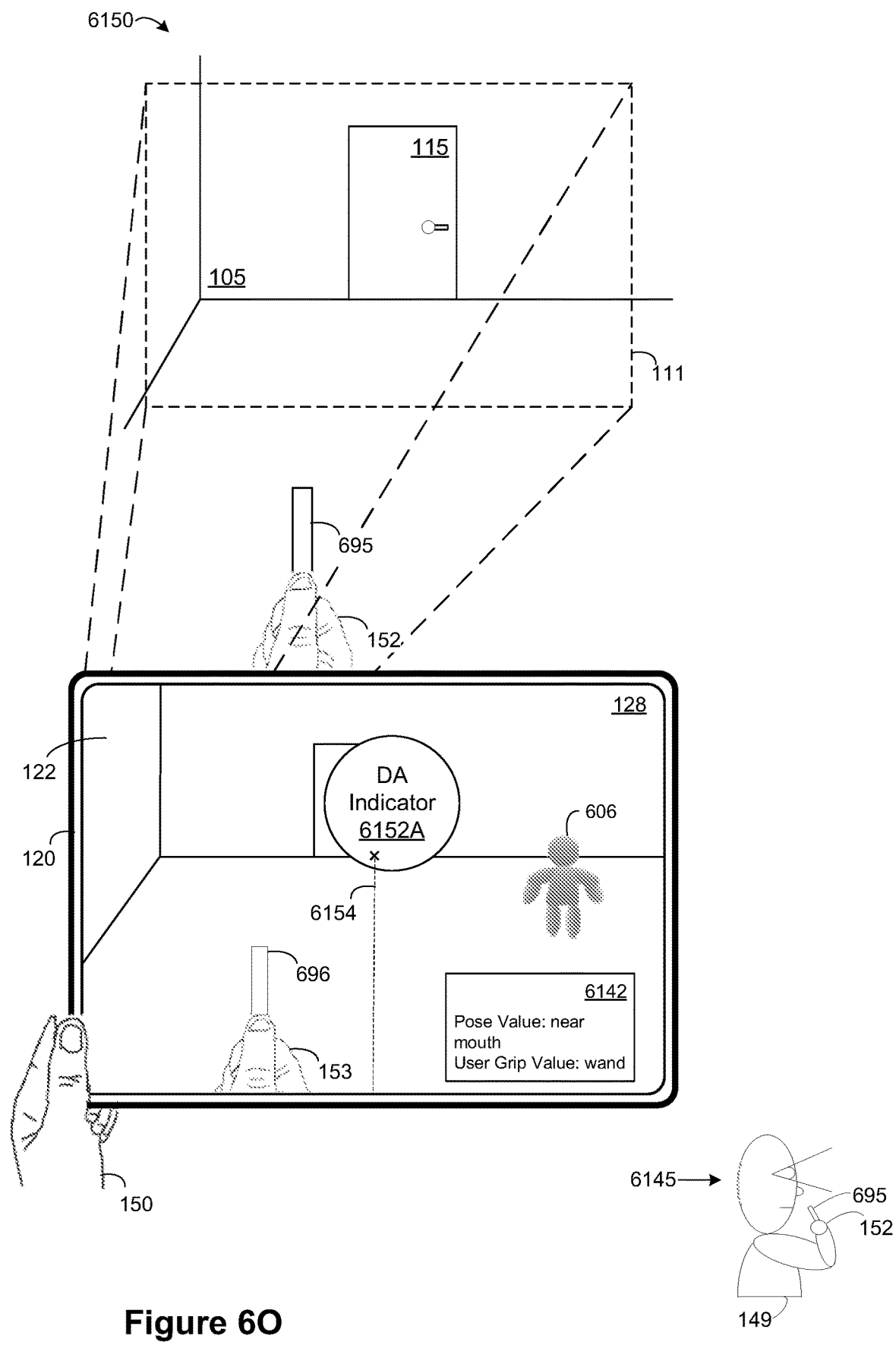

As shown in FIG. 6O, during the instance 6150 (e.g., associated with time $T_{15}$) of the content delivery scenario, the electronic device 120 displays a digital assistant (DA) indicator 6152A (e.g., an icon, a badge, an image, a text box, a notification, or the like) within the XR environment 128. As shown in FIG. 6O, the XR environment 128 also includes a visualization 6154 of a gaze direction of the user 149, which is currently directed to the DA indicator 6152A in FIG. 6O. One of ordinary skill in the art will appreciate that the DA indicator 6152A is merely an example visualization that may be modified or replaced in various other implementations. One of ordinary skill in the art will appreciate that the visualization 6154 of the gaze direction may not be displayed in various other implementations.

Figure 6P:
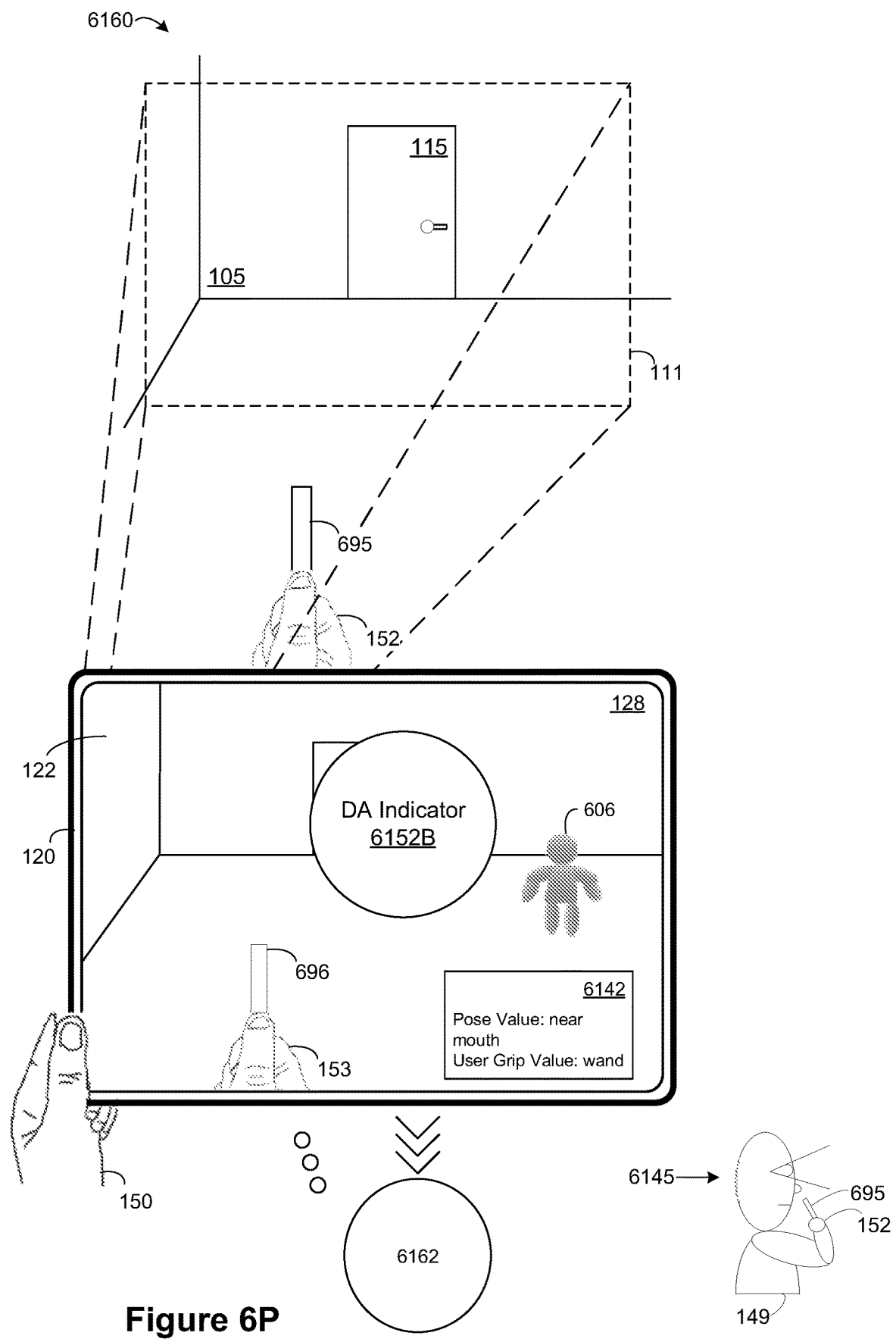

As shown in FIG. 6P, during the instance 6160 (e.g., associated with time $T_{16}$) of the content delivery scenario, the electronic device 120 provides an audio output 6162 (e.g., prompting the user 149 to provide a search string or a voice command) and displays a DA indicator 6152B within the XR environment 128 in response to detecting that the gaze direction of the user 149 has been directed to the DA indicator 6152A for at least a predefined amount of time in FIG. 6O. As shown in FIG. 6P, the DA indicator 6152B is associated with a larger size than the DA indicator 6152A in FIG. 6O. In some implementations, the electronic device 120 changes an appearance of the DA indicator (e.g., as shown in FIGS. 6O and 6P) in response to detecting that the gaze direction of the user 149 has been directed to the DA indicator for at least a predefined amount of time to indicate that the DA is ready to receive a search string or a voice command.

Figure 6Q:
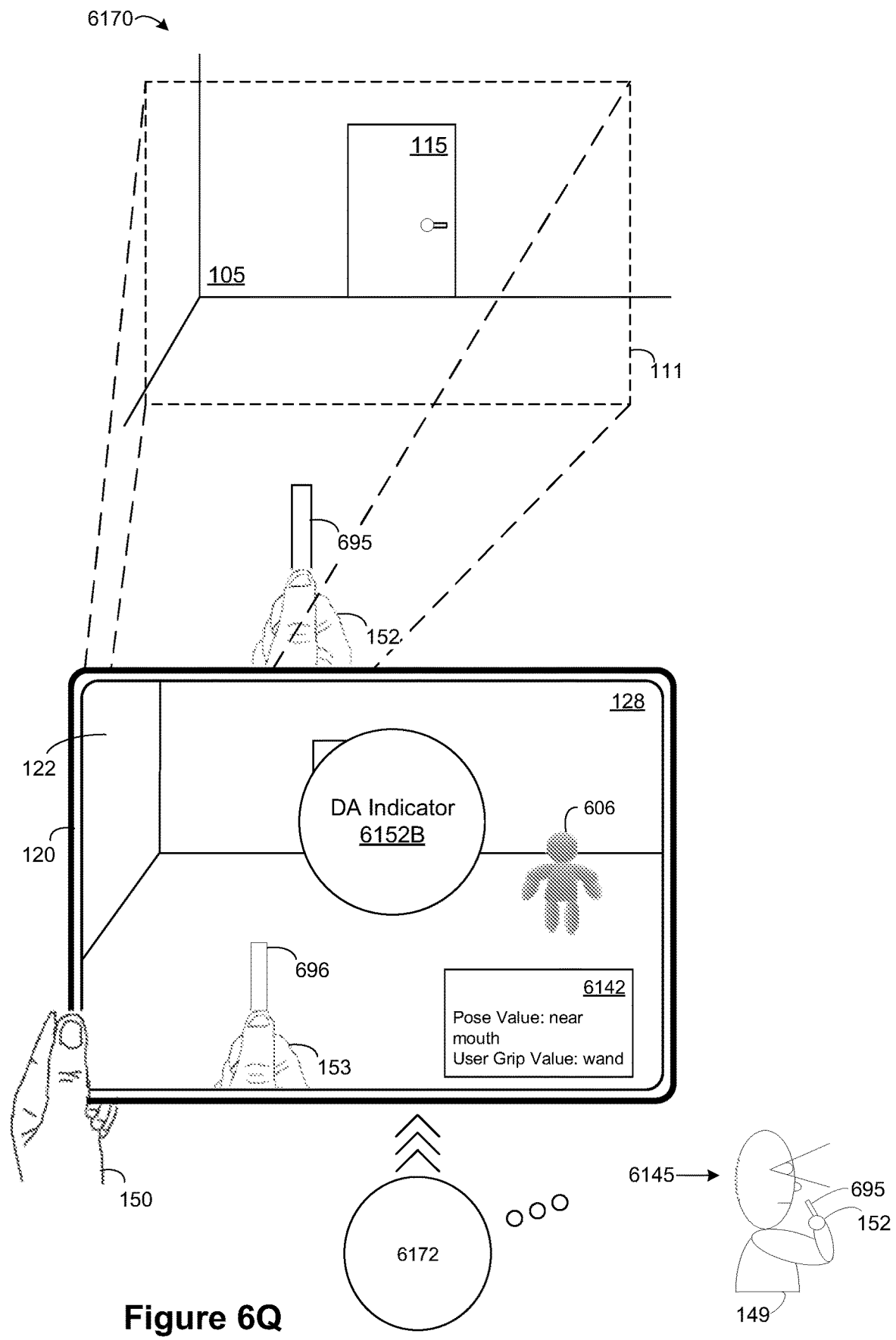
Figure 6R:
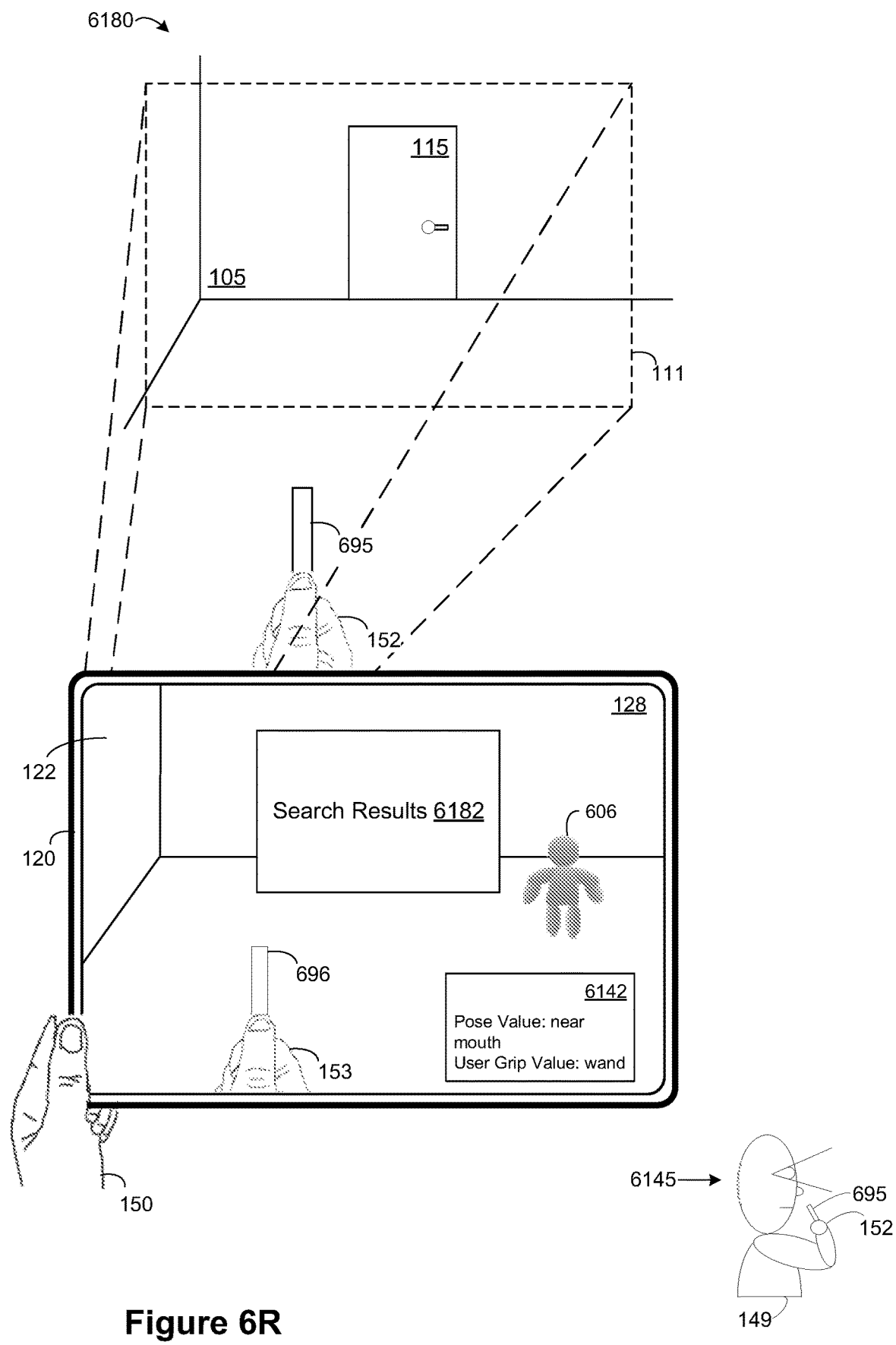

As shown in FIG. 6Q, during the instance 6170 (e.g., associated with time $T_{17}$) of the content delivery scenario, the electronic device 120 detects a speech input 6172 from the user 149 (e.g., a search string). As shown in FIG. 6R, during the instance 6180 (e.g., associated with time $T_{18}$) of the content delivery scenario, the electronic device 120 presents search results 6182 within the XR environment that corresponds to the search string associated with the speech input 6172 detected in FIG. 6Q. For example, the search results 6182 include text, audio content, video content, 3D content, XR content, and/or the like.

Figure 7:
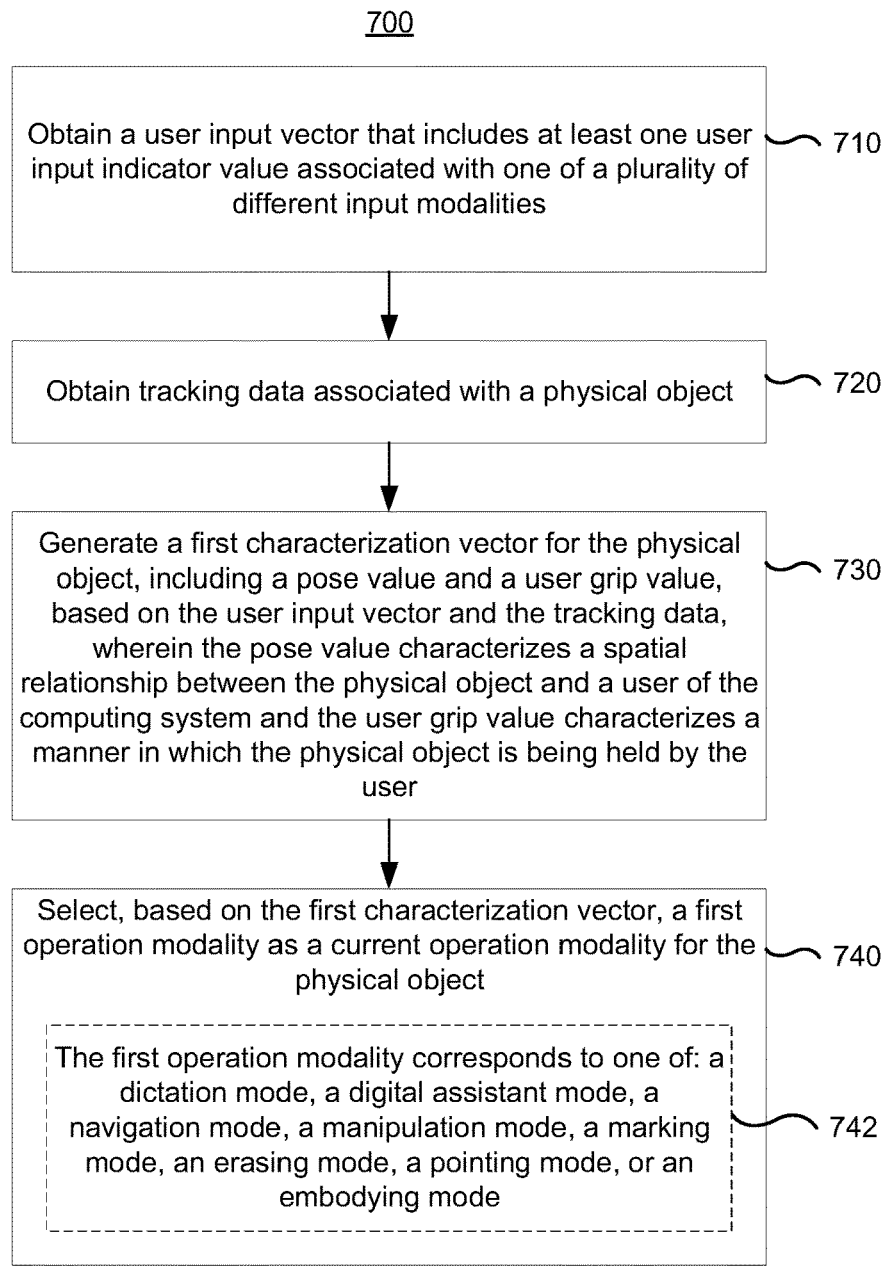
FIG. 7 is a flowchart representation of a method of dynamically selecting an operation modality for a physical object in accordance with some implementations.

FIG. 7 is a flowchart representation of a method 700 of dynamically selecting an operation modality for a physical object in accordance with some implementations. In various implementations, the method 700 is performed at a computing system including non-transitory memory and one or more processors, wherein the computing system is communicatively coupled to a display device and (optionally) one or more input devices (e.g., the electronic device 120 shown in FIGS. 1 and 3; the processing device 110 in FIGS. 1 and 2; or a suitable combination thereof). In some implementations, the method 700 is performed by processing logic, including hardware, firmware, software, or a combination thereof. In some implementations, the method 700 is performed by a processor executing code stored in a non-transitory computer-readable medium (e.g., a memory). In some implementations, the computing system corresponds to one of a tablet, a laptop, a mobile phone, a near-eye system, a wearable computing device, or the like.

As discussed above, in order to change the behavior of a stylus, a user typically selects a different tool from a menu of available tools. This can be a clumsy and cumbersome process. In contrast, the innovation described herein enables a user to dynamically change the operation modality of a physical object (e.g., a proxy object or an electronic device such as a stylus, a finger-wearable device, a handheld device, or the like) based on the pose and grip thereof. For example, a computing system (e.g., a presentation device) determines the pose and grip of the physical object based on tracking data associated with the physical object itself as well as other inputs, such as computer vision, eye tracking, hand/extremity tracking, voice inputs, etc., obtained by the computing system. As such, the user may seamlessly change the operation modality of the physical object (e.g., a handheld stylus) without interrupting his/her workflow.

As represented by block 710, the method 700 includes obtaining (e.g., receiving, retrieving, or detecting/collecting) a user input vector that includes at least one user input indicator value associated with one of a plurality of different input modalities. For example, the user input vector via the one or more input devices of the computing system. Continuing with this example, the one or more input devices may include an eye tracking engine, a finger/hand/extremity tracking engine, a head/body pose tracking engine, one or more microphones, exterior-facing image sensors, and/or the like.

As shown in FIG. 5A, the first portion 500A of the content delivery architecture includes an eye tracking engine 512 that determines/generates an eye tracking vector 513 based on the local sensor data 503 and the remote sensor data 505 and updates the eye tracking vector 513 over time. Furthermore, as shown in FIG. 5A, the first portion 500A of the content delivery architecture includes a body/head pose tracking engine 514 that determines/generates a pose characterization vector 515 based on the local sensor data 503 and the remote sensor data 505 and updates the pose characterization vector 515 over time. According to some implementations, the eye tracking vector 513 and the pose characterization vector 515 are collectively referred to as a user input vector 519. FIG. 5B illustrates example data structures for the eye tracking vector 513 and the pose characterization vector 515.

In some implementations, the computing system is further communicatively coupled to one or more exterior-facing image sensors, and wherein obtaining the tracking data associated with the physical object includes analyzing an image stream captured by the one or more exterior-facing image sensors in order to visually track the physical object In some implementations, the computing system is further communicatively coupled to an extremity tracking subsystem that outputs one or more extremity tracking indicator values, wherein the one or more extremity tracking indicator values are associated with an extremity tracking modality of the plurality of input modalities, and wherein the user input vector includes the one or more extremity tracking indicator values.

In some implementations, the computing system is further communicatively coupled to a head/body pose tracking subsystem that outputs one or more head/body pose tracking indicator values, wherein the one or more head/body pose tracking indicator values are associated with a head/body pose tracking modality of the plurality of input modalities, and wherein the user input vector includes the one or more head/body pose tracking indicator values.

In some implementations, the computing system is further communicatively coupled to a voice detection subsystem that outputs one or more voice detection indicator values, wherein the one or more voice detection indicator values are associated with a voice detection modality of the plurality of input modalities, and wherein the user input vector includes the one or more voice detection indicator values.

In some implementations, the computing system is further communicatively coupled to an eye tracking subsystem that outputs one or more eye tracking indicator values, wherein the one or more eye tracking indicator values are associated with an eye tracking modality of the plurality of input modalities, and wherein the user input vector includes the one or more eye tracking indicator values.

As represented by block 720, the method 700 includes obtaining (e.g., receiving, retrieving, or detecting/collecting) tracking data associated with a physical object. As shown in FIG. 5A, the first portion 500A of the content delivery architecture includes an object tracking engine 510 that determines/generates an object tracking vector 511 based on the tracking data 506 and updates the object tracking vector 511 over time. FIG. 5B illustrates an example data structure for the object tracking vector 511.

As one example, the physical object corresponds to a proxy object detected within the physical environment that lacks a communication channel to the computing system such as a pencil, a pen, a ruler, a stick, etc. FIGS. 6I-6R illustrate a user 149 grasping a physical object 695 that is incapable of communicating with the electronic device 120 and is used to interact with the XR environment 128. As another example, the physical object corresponds to an electronic device with a wired or wireless communication channel to the computing system such as a stylus, a finger-wearable device, a handheld device, or the like. FIGS. 6A-6H illustrate the user 149 grasping a controller 130 that communicates with the electronic device 120 and is used to interact with the XR environment 128. According to some implementations, the computing system dynamically selects an operation modality for the physical object whether the physical object corresponds to a proxy object or an electronic device.

In some implementations, the one or more input devices include one or more exterior-facing image sensors, and wherein obtaining the tracking data associated with the physical object includes analyzing an image stream captured by the one or more exterior-facing image sensors in order to visually track the physical object. In some implementations, the tracking data corresponds to one or more images of the physical environment that include the physical object to enable tracking of the physical object with six degrees of freedom (6DOF) via computer vision techniques. In some implementations, the tracking data corresponds to data collected by various integrated sensors of the physical object such as a GPS, IMU, accelerometer, gyroscope, magnetometer, etc. For example, the tracking data corresponds to raw sensor data or processed data such as translational values associated with the physical object (relative to the physical environment or the world at large), rotational values associated with the physical object (relative to gravity), a velocity value associated with the physical object, an angular velocity value associated with the physical object, an acceleration value associated with the physical object, an angular acceleration value associated with the physical object, a first pressure value associated with how hard the physical object is contacting a physical surface, a second pressure value associated with how hard the physical object is being grasped by the user, and/or the like. In some implementations, the computing system also obtains finger manipulation data detected by the physical object via a communication interface. For example, the finger manipulation data includes touch inputs or gestures directed to a touch-sensitive region of the physical object and/or the like. For example, the finger manipulation data includes contact intensity data relative to the body of the physical object.

In some implementations, the computing system is further communicatively coupled to the physical object, and wherein obtaining the tracking data associated with the physical object includes obtaining the tracking data from the physical object, wherein the tracking data corresponds to output data from one or more integrated sensors of the physical object. As such, according to some implementations, the tracking data associated with the physical object includes the pose value. FIGS. 6A-6H illustrate a user 149 grasping a controller 130 that communicates with the electronic device 120 and is used to interact with the XR environment 128. For example, the one or more integrated sensors includes at least one of an IMU, an accelerometer, a gyroscope, a GPS, a magnetometer, one or more contact intensity sensors, a touch-sensitive surface, and/or the like. In some implementations, the tracking data further indicates whether or not tip of the physical object contacts a physical surface and a pressure value associated therewith.

In some implementations, the computing system is further communicatively coupled to the physical object, and wherein obtaining the user input vector includes obtaining the user input vector from the physical object, wherein the user input vector corresponds to output data from one or more integrated sensors of the physical object. As such, according to some implementations, the user input vector includes the user grip value.

In some implementations, the method 700 includes: obtaining one or more images of a physical environment: recognizing the physical object with the one or more images of the physical environment: and assigning the physical object (e.g., a proxy object) to act as a focus selector when interacting with a user interface. FIGS. 6I-6R illustrate a user 149 grasping a physical object 695 that is incapable of communicating with the electronic device 120 and is used to interact with the XR environment 128. In some implementations, the computing system designates the physical object as the focus selector when the physical object is grasped by the user. In some implementations, the computing system designates the physical object as the focus selector when the physical object is grasped by the user and the physical object satisfies predefined constraints (e.g., a maximum or minimum size, a particular shape, digital rights management (DRM) disqualifiers, etc.). As such, in some implementations, the user may use household objects to interact with the XR environment. In some implementations, the pose and grip indicators may be anchored to the proxy object (or a representation thereof) as the proxy object moves and/or the FOV moves.

As represented by block 730, the method 700 includes generating a first characterization vector for the physical object, including a pose value and a user grip value, based on the user input vector and the tracking data, wherein the pose value characterizes a spatial relationship between the physical object and a user of the computing system, and wherein the user grip value characterizes a manner in which the physical object is being held by the user. As shown in FIG. 5A, the first portion 500A of the content delivery architecture includes a characterization engine 542 that determines/generates a characterization vector 543 for the physical object based on a user input vector (e.g., a combination of the eye tracking vector 513 and the pose characterization vector 515) and the tracking data (e.g., the object tracking vector 511) and updates the characterization vector 543 over time. FIG. 5B illustrates an example data structure for the characterization vector 543 including a user grip value 5102 and a pose value 5104.

In some implementations, the user input vector is used to fill-in and disambiguate any occlusions or gaps in the tracking data. As such, in some implementations, the computing system may use the user input vector if the pose value and user grip value determined/generated based on the tracking data fails to breach a predetermined confidence value in order to reduce resource consumption.

For example, the pose value corresponds to one of a neutral pose, a conductor/wand pose, a writing pose, a surface pose, a near mouth pose, an aimed pose, or the like. In some implementations, the pose value indicates an orientation of the physical object such as relative to a physical surface or another object that is detectable via computer vision techniques. In one example, the other object corresponds to a different physical object or a virtual object within a viewable region of the environment. In another example, the other object corresponds to a different physical object or a virtual object that is outside of the viewable region of the environment but may be inferred such as the physical object moving near the mouth of the user. For example, the pose value may indicate proximity of the physical object relative to the other object. For example, the grip value corresponds to one of a remote-control-esque grip, a wand-esque grip, a writing grip, an inverse writing grip, a handle grip, a thumb top grip, a level-esque grip, a gamepad-esque grip, a flute-esque grip, a fire-starter-esque grip, or the like.

As represented by block 740, the method 700 includes selecting, based on the first characterization vector, a first operation modality as a current operation modality for the physical object. As one example, with reference to FIG. 6B, in response to determining that the current pose value corresponds to "near mouth" and that the current user grip value corresponds to "wand," the electronic device 120 selects a dictation mode as the current operation modality for the controller 130 and also displays a notification 624 indicating: "Dictation Mode Activated." As such, while the current operation modality of the controller 130 corresponds to the dictation mode, the user 149 is able to dictate a blurb, a note, content to be displayed within the XR environment 128, or the like. In some implementations in which the physical object does not include one or more microphones, microphones of the electronic device 120 can be used to sense the user's speech. some implementations in which the physical object does not include one or more microphones, images captured by image sensors of the electronic device 120 can be analyzed to read the user's lips and, in turn, sense the user's speech. One of ordinary skill in the art will appreciate that the notification 624 is merely an example visualization that may be modified or replaced in various other implementations.

As another example, with reference to FIG. 6C, in response to determining that the current pose value corresponds to "neutral" and that the current user grip value corresponds to "writing," the electronic device 120 selects a marking mode as the current operation modality for the controller 130 and also displays a notification 634 indicating: "Marking Mode Activated." As yet another example, with reference to FIG. 6F, in response to determining that the current pose value corresponds to "surface" and that the current user grip value corresponds to "inverse writing," the electronic device 120 selects an erasing mode as the current operation modality for the controller 130 and also displays a notification 664 indicating: "Erasing Mode Activated."

As yet another example, with reference to FIG. 6I, in response to determining that the current pose value corresponds to "aimed" and that the current user grip value corresponds to "wand," the electronic device 120 selects a pointing mode as the current operation modality for the physical object 695 and also displays a notification 694 indicating: "Pointing Mode Activated." As such, while the current operation modality of the physical object 695 corresponds to the pointing mode, the user 149 is able to use the physical object 695 as a laser pointer type device within the XR environment 128. As yet another example, with reference to FIG. 6I, in response to determining that the current pose value corresponds to "neutral" and that the current user grip value corresponds to "wand," the electronic device 120 selects a manipulation mode as the current operation modality for the physical object 695 and also displays a notification 6114 indicating: "Manipulation Mode Activated." As such, while the current operation modality of the physical object 695 corresponds to the manipulation mode, the user 149 is able to use the physical object 695 to manipulate (e.g., translate, rotate, and/or the like) the XR content within the XR environment 128.

In some implementations, as represented by block 742, the first operation modality corresponds to one of: a dictation mode, a digital assistant mode, a navigation mode, a manipulation mode, a marking mode, an erasing mode, a pointing mode, or an embodying mode. As one example, the first operation modality corresponds to the marking mode when the pose value corresponds to a neutral pose (or a surface pose) and the user grip value corresponds to a writing utensil-like grip. As another example, the first operation modality corresponds to the erasing mode when the pose value corresponds to a neutral pose (or a surface pose) and the user grip value corresponds to an inverse writing utensil-like grip. As yet another example, the first operation modality corresponds to the dictation mode when the pose value corresponds to a near-mouth pose and the user grip value corresponds to a wand-like grip. As yet another example, the first operation modality corresponds to the manipulation mode when the pose value corresponds to a neutral pose and the user grip value corresponds to a wand-like grip. As yet another example, the first operation modality corresponds to the pointing mode when the pose value corresponds to an aimed pose and the user grip value corresponds to a wand-like grip. As yet another example, the first operation modality corresponds to the digital assistant mode when the pose value corresponds to a near-mouth pose and the user grip value corresponds to a wand-like grip and the computing device detects a speech input with a keyword or key phrase. One of ordinary skill in the art will appreciate that different combinations of pose and user grip values may trigger the aforementioned In some implementations, after selecting the first operation modality as the current output modality for the physical object, the method 700 includes presenting, via the display device, an extended reality (XR) environment including one or more virtual objects, wherein the physical object is provided to interact with the one or more virtual objects within the XR environment according to the first operation modality. In some implementations, the one or more virtual objects are overlaid on the physical environment while displayed within the XR environment. As one example, in FIG. 6A, the XR environment 128 includes a representation 116 of the door 115 and a virtual agent 606 overlaid on a representation of the physical environment 105. As another example, in FIG. 6K, the XR environment 128 includes a first perspective 6116A of XR content (e.g., a frontside of a cube, a box, or the like) overlaid on a representation of the physical environment 105.

In some implementations, the display device corresponds to a transparent lens assembly, and wherein the presentation of the XR environment is projected onto the transparent lens assembly. In some implementations, the display device corresponds to a near-eye system, and wherein presenting the XR environment includes compositing the presentation of the XR environment with one or more images of a physical environment captured by an exterior-facing image sensor.

In some implementations, the XR environment includes one or more visual indicators associated with at least one of the pose value and the user grip value. As one example, in FIG. 6A, the XR environment 128 includes a visual indicator 612 for the instance 610 with the current pose value (e.g., no current pose value because the controller 130 is currently not being grasped by the user 149) and the current user grip value (e.g., no user grip value because the controller 130 is currently not being grasped by the user 149). One of ordinary skill in the art will appreciate that the visual indicator 612 is merely an example visualization with the pose and user grip values that may be modified or replaced in various other implementations. As one example, the visual indicator 612 may be a badge, an icon, an audio output, or the like instead of a text notification. As another example, in FIG. 6B, the XR environment 128 includes a visual indicator 622 for the instance 620 with the current pose value (e.g., near mouth) and the current user grip value (e.g., wand), and a representation 131 of the controller 130 being held by a representation 153 of the right hand 152 of the user 149 (e.g., video pass-through of the physical environment 105).

In some implementations, the one or more visual indicators correspond to an icon, a badge, a text box, a notification, or the like to indicate the current pose and grip values to the user. In some implementations, the one or more visual indicators are one of world-locked, head-locked, body-locked, or the like. In one example, the one or more visual indicators may be anchored to the physical object (or a representation thereof) as the physical object moves and/or the FOV moves. In some implementations, the one or more visual indicators may change over time based on changes to the tracking data and/or the user input vector. For example, the visual indicator associated with the pose value includes a representation (e.g., an icon) of the physical object and a representation of associated pose.

In some implementations, the XR environment includes one or more visual indicators associated with the current operation modality. As one example, in FIG. 6B, the XR environment 128 includes a notification 624 indicating: "Dictation Mode Activated." One of ordinary skill in the art will appreciate that the notification 624 is merely an example visualization that may be modified or replaced in various other implementations. In some implementations, the one or more visual indicators correspond to an icon, a badge, a text box, a notification, or the like to indicate the current operation modality to the user. In some implementations, the one or more visual indicators are one of world-locked, head-locked, body-locked, or the like. In one example, the one or more visual indicators may be anchored to the physical object (or a representation thereof) as the physical object moves and/or the FOV moves. In some implementations, the one or more visual indicators may change over time based on changes to the tracking data and/or the user input vector.

In some implementations, after selecting the first operation modality as the current output modality for the physical object, the method 700 includes: displaying, via the display device, a user interface: and detecting a modification input with the physical object directed to content within the user interface (e.g., by tracking the physical object in 3D with IMU data, computer vision, magnetic tracking, etc.); and in response to detecting the modification input, modifying the content within the user interface based on the modification input (e.g., the magnitude, shape, displacement, etc. of the modification input) and the first operation modality. As one example, FIGS. 6C-6E illustrate a sequence in which the electronic device 120 displays a mark 654 within the XR environment 128 in response to detecting the marking input 644 in FIG. 6E (e.g., the modification input). For example, the mark 654 corresponds to the shape, displacement, etc. of the marking input 644. In another example, the mark 654 corresponds to a function of the shape, displacement, etc. of the marking input 644 and a weight coefficient (e.g., an amplification value, an attenuation value, or the like). As another example, FIGS. 6K-6M illustrate a sequence in which the electronic device 120 rotates XR content by 180° in the clockwise direction from a first perspective 6116A in FIG. 6K (e.g., a frontside of a cube, the box, or the like) to a second perspective 6116B in FIG. 6M (e.g., a backside of the cube, the box, or the like) in response to detecting a manipulation input 6122 in FIG. 6L (e.g., the modification input).

In some implementations, the method 700 includes: detecting a change in one of the user input vector or the tracking data associated with the physical object: determining a second characterization vector for the physical object based on the change in one of the user input vector or the tracking data associated with the physical object: and selecting, based on the second characterization vector, a second operation modality as a current operation modality for the physical object, wherein the second operation modality is different from the first operation modality. In some implementations, the method 700 includes: displaying, via the display device, a user interface: after selecting the second operation modality as the current output modality for the physical object, detecting a modification input with the physical object directed to content within the user interface (e.g., by tracking the physical object in 3D with IMU data, computer vision, magnetic tracking, etc.); and in response to detecting the modification input, modifying the content within the user interface based on the modification input (e.g., the magnitude, shape, displacement, etc. of the modification input) and the second operation modality.

In some implementations, the method 700 includes: in response to determining that first operation modality corresponds to invoking a digital assistant, displaying a digital assistant (DA) indicator within a user interface: and in response to determining that the one or more eye tracking indicator values correspond to the DA indicator, changing an appearance of the DA indicator and enabling the DA. In some implementations, changing the appearance of the DA indicator corresponds at least one of scaling a size of the DA indicator, changing a color of the DA indicator, changing a brightness of the DA indicator, or the like. As one example, FIGS. 6N-6R illustrate a sequence in which the current operation modality corresponds to a digital assistant (DA) mode. Continuing with this example, an appearance of the DA indicator changes (e.g., increases in size from the DA indicator 6152A in FIG. 6O to the DA indicator 6152B in FIG. 6P) in response to detecting that the gaze direction of the user 149 has been directed to the DA indicator for at least a predefined amount of time. Continuing with this example, the DA performs a search operation based on a speech input 6172 from the user 149 (e.g., a search string) in FIG. 6Q, and the electronic device 120 displays search results 6182 within the XR environment that correspond to the search string associated with the speech input 6172 detected in FIG. 6Q. For example, the search results 6182 includes text, audio content, video content, 3D content, XR content, and/or the like.

In some implementations, the DA indicator is displayed adjacent to the location of the physical object and remains anchored to the physical object (or a representation thereof) as the physical object moves and/or the FOV moves. In some implementations, the electronic device obtains a search string, and in response, obtains resultant info from the DA that is displayed within the XR environment. In one example, the user may translate and/or rotate the resultant info within the XR environment. In another example, the user may pin the resultant info to a bulletin board or other repository within the XR environment.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first", "second", etc. may be used herein to describe various elements, these elements should not be limited by these terms. These terms are only used to distinguish one element from another. For example, a first media item could be termed a second media item, and, similarly, a second media item could be termed a first media item, which changing the meaning of the description, so long as the occurrences of the "first media item" are renamed consistently and the occurrences of the "second media item" are renamed consistently. The first media item and the second media item are both media items, but they are not the same media item.

The terminology used herein is for the purpose of describing particular implementations only and is not intended to be limiting of the claims. As used in the description of the implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at a computing system including non-transitory memory and one or more processors, wherein the computing system is communicatively coupled to a display device:
obtaining a user input vector that includes at least one user input indicator value associated with one of a plurality of different input modalities;
obtaining tracking data associated with a physical object;
generating a first characterization vector for the physical object, including a pose value and a user grip value, based on the user input vector and the tracking data, wherein the pose value characterizes a position of the physical object relative to a user of the computing system and the user grip value characterizes a manner in which the physical object is being held by the user; and
selecting, based on the first characterization vector, a first operation modality as a current operation modality for the physical object.

2. The method of claim 1, wherein the first operation modality corresponds to one of: a dictation mode, a digital assistant mode, a navigation mode, a manipulation mode, a marking mode, an erasing mode, a pointing mode, or an embodying mode.

3. The method of claim 1, further comprising:
after selecting the first operation modality as the current operation modality for the physical object:
displaying, via the display device, a user interface; and
detecting a modification input with the physical object directed to content within the user interface; and
in response to detecting the modification input, modifying the content within the user interface based on the modification input and the first operation modality.

4. The method of claim 1, further comprising:
detecting a change in one of the user input vector or the tracking data associated with the physical object; and
in response to detecting the change in one of the user input vector or the tracking data associated with the physical object:
determining a second characterization vector for the physical object based on the change in one of the user input vector or the tracking data associated with the physical object; and
selecting, based on the second characterization vector, a second operation modality as the current operation modality for the physical object, wherein the second operation modality is different from the first operation modality.

5. The method of claim 4, further comprising:
displaying, via the display device, a user interface;
after selecting the second operation modality as the current operation modality for the physical object, detecting a modification input with the physical object directed to content within the user interface; and
in response to detecting the modification input, modifying the content within the user interface based on the modification input and the second operation modality.

6. The method of claim 1, further comprising:
after selecting the first operation modality as the current operation modality for the physical object, presenting, via the display device, an extended reality (XR) environment including one or more virtual objects, wherein the physical object is provided to interact with the one or more virtual objects within the XR environment according to the first operation modality.

7. The method of claim 6, wherein the display device corresponds to a transparent lens assembly, and wherein the presentation of the XR environment is projected onto the transparent lens assembly.

8. The method of claim 6, wherein the display device corresponds to a near-eye system, and wherein presenting the XR environment includes compositing the presentation of the XR environment with one or more images of a physical environment captured by an exterior-facing image sensor.

9. The method of claim 6, wherein the XR environment includes one or more visual indicators associated with at least one of the pose value and the user grip value.

10. The method of claim 6, wherein the XR environment includes one or more visual indicators associated with the current operation modality.

11. The method of claim 1, further comprising:
obtaining one or more images of a physical environment;
recognizing the physical object with the one or more images of the physical environment; and
assigning the physical object to act as a focus selector when interacting with a user interface.

12. The method of claim 1, wherein the computing system is further communicatively coupled to the physical object, and wherein obtaining the tracking data associated with the physical object includes obtaining the tracking data from the physical object, wherein the tracking data corresponds to output data from one or more integrated sensors of the physical object.

13. The method of claim 12, wherein the tracking data associated with the physical object includes the pose value.

14. The method of claim 1, wherein the computing system is further communicatively coupled to the physical object, and wherein obtaining the user input vector includes obtaining the user input vector from the physical object, wherein the user input vector corresponds to output data from one or more integrated sensors of the physical object.

15. The method of claim 14, wherein the user input vector includes the user grip value.

16. The method of claim 1, wherein the computing system is further communicatively coupled to one or more exterior-facing image sensors, and wherein obtaining the tracking data associated with the physical object includes analyzing an image stream captured by the one or more exterior-facing image sensors in order to visually track the physical object.

17. The method of claim 1, wherein the computing system is further communicatively coupled to an extremity tracking subsystem that outputs one or more extremity tracking indicator values, wherein the one or more extremity tracking indicator values are associated with an extremity tracking modality of the plurality of input modalities, and wherein the user input vector includes the one or more extremity tracking indicator values.

18. The method of claim 1, wherein the computing system is further communicatively coupled to a head/body pose tracking subsystem that outputs one or more head/body pose tracking indicator values, wherein the one or more head/body pose tracking indicator values are associated with a head/body pose tracking modality of the plurality of input modalities, and wherein the user input vector includes the one or more head/body pose tracking indicator values.

19. A device comprising:
one or more processors;
a non-transitory memory;
an interface for communicating with a display device; and
one or more programs stored in the non-transitory memory, which, when executed by the one or more processors, cause the device to:
obtain a user input vector that includes at least one user input indicator value associated with one of a plurality of different input modalities;
obtain tracking data associated with a physical object;
generate a first characterization vector for the physical object, including a pose value and a user grip value, based on the user input vector and the tracking data, wherein the pose value characterizes a position of the physical object relative to a user of the device and the user grip value characterizes a manner in which the physical object is being held by the user; and
select, based on the first characterization vector, a first operation modality as a current operation modality for the physical object.

20. A non-transitory memory storing one or more programs, which, when executed by one or more processors of a device with an interface for communicating with a display device, cause the device to:
obtain a user input vector that includes at least one user input indicator value associated with one of a plurality of different input modalities;
obtain tracking data associated with a physical object;
generate a first characterization vector for the physical object, including a pose value and a user grip value, based on the user input vector and the tracking data, wherein the pose value characterizes a position of the physical object relative to a user of the device and the user grip value characterizes a manner in which the physical object is being held by the user; and
select, based on the first characterization vector, a first operation modality as a current operation modality for the physical object.

* * * * *